(12) United States Patent
Osabe et al.

(10) Patent No.: US 8,500,871 B2
(45) Date of Patent: Aug. 6, 2013

(54) WATER-VAPOR-PERMEABLE MEMBRANE, HOLLOW-FIBER MEMBRANE, AND HOLLOW-FIBER MEMBRANE MODULE

(75) Inventors: Masahiro Osabe, Otsu (JP); Kazumi Tanaka, Otsu (JP); Hiroyuki Sugaya, Otsu (JP)

(73) Assignee: Toray Industries, Inc., Tokyo (JP)

( * ) Notice: Subject to any disclaimer, the term of this patent is extended or adjusted under 35 U.S.C. 154(b) by 39 days.

(21) Appl. No.: 13/391,340

(22) PCT Filed: Aug. 21, 2009

(86) PCT No.: PCT/JP2009/064612
§ 371 (c)(1),
(2), (4) Date: Feb. 20, 2012

(87) PCT Pub. No.: WO2011/021300
PCT Pub. Date: Feb. 24, 2011

(65) Prior Publication Data
US 2012/0174790 A1     Jul. 12, 2012

(51) Int. Cl.
*B01D 53/22*     (2006.01)

(52) U.S. Cl.
USPC ............... 96/8; 95/43; 95/45; 95/52; 96/7; 96/11

(58) Field of Classification Search
USPC ............... 95/43, 45, 52; 96/7, 8, 11
See application file for complete search history.

(56) References Cited

U.S. PATENT DOCUMENTS

| | | | | |
|---|---|---|---|---|
| 4,678,581 A | * | 7/1987 | Nogi et al. | 210/500.23 |
| 5,108,464 A | * | 4/1992 | Friesen et al. | 95/52 |
| 5,451,386 A | * | 9/1995 | Collins et al. | 423/237 |
| 5,789,024 A | * | 8/1998 | Levy et al. | 427/244 |
| 6,355,730 B1 | * | 3/2002 | Kozawa et al. | 525/189 |

(Continued)

FOREIGN PATENT DOCUMENTS

| | | |
|---|---|---|
| JP | 61-164602 A | 7/1986 |
| JP | 62-241527 A | 10/1987 |

(Continued)

OTHER PUBLICATIONS

Machine Translation Taniguchi et al. JP 07-000710 Jun. 1, 1995.*

(Continued)

*Primary Examiner* — Jason M Greene
*Assistant Examiner* — Anthony Shumate
(74) *Attorney, Agent, or Firm* — RatnerPrestia

(57) ABSTRACT

A water vapor permeable membrane is provided comprising a dense layer and a support layer that are adjacent to each other, wherein the dense layer contains voids with a void length of 0.1 μm or less and the dense layer has a thickness of 0.1 μm or more and 2 μm or less while in the support layer, void (a), i.e. the void with the largest length in the 2 μm thick region measured from the boundary between the dense layer and the support layer into the support layer, has a length of 0.3 μm or more and void (b), i.e. the void with the largest length in the region ranging between 2 μm and 4 μm measured from the boundary into the support layer, has a length of 0.5 μm or more, the length of the void (b) being larger than that of the void (a). A water vapor permeable membrane having both a high water vapor permeability and a low air leakage is provided.

10 Claims, 10 Drawing Sheets

U.S. PATENT DOCUMENTS

| | | | |
|---|---|---|---|
| 6,448,199 B1 * | 9/2002 | Choudhary et al. | 502/339 |
| 7,879,137 B2 * | 2/2011 | Parekh et al. | 95/52 |
| 8,366,811 B2 * | 2/2013 | Ophir et al. | 96/4 |
| 2010/0000936 A1 * | 1/2010 | Osabe et al. | 210/487 |
| 2011/0030382 A1 * | 2/2011 | Eadon et al. | 60/780 |
| 2012/0186446 A1 * | 7/2012 | Bara et al. | 95/44 |

FOREIGN PATENT DOCUMENTS

| | | |
|---|---|---|
| JP | 6-165926 A | 6/1994 |
| JP | 7-710 A | 1/1995 |
| JP | 08-246283 | 9/1996 |
| JP | 2001-219043 | 8/2001 |
| JP | 2004-006100 | 1/2004 |
| JP | 2004-209418 | 7/2004 |
| JP | 2004-290751 | 10/2004 |
| JP | 2004-311287 | 11/2004 |
| JP | 2006-304826 A | 11/2006 |
| JP | 200-289944 A | 11/2007 |
| JP | 2008-133560 A | 6/2008 |
| JP | 2009-101346 A | 5/2009 |
| JP | 2009-226397 A | 10/2009 |

OTHER PUBLICATIONS

Machine Translation Osabe et al. JP 2007-289944 Aug. 11, 2007.*

Machine Translation Nagashima et al. JP 2008-133560 Dec. 6, 2008.*

International Search Report dated Nov. 2, 2009, application No. PCT/P2009/064612.

* cited by examiner 220        230

WATER-VAPOR-PERMEABLE MEMBRANE, HOLLOW-FIBER MEMBRANE, AND HOLLOW-FIBER MEMBRANE MODULE

CROSS REFERENCE TO RELATED APPLICATIONS

This application is the U.S. National Phase application of PCT International Application No. PCT/JP2009/064612, filed Aug. 21, 2009, the disclosure of which is incorporated herein by reference in its entirety for all purposes.

FIELD OF THE INVENTION

The invention relates to a water vapor permeable membrane, a water vapor permeable, hollow fiber membrane that is produced from this water vapor permeable membrane, and a hollow fiber membrane module produced from this hollow fiber membrane. More specifically, the invention relates to a water vapor permeable membrane, a hollow fiber membrane, and a hollow fiber membrane module that are used favorably in humidifiers of fuel cell systems.

BACKGROUND OF THE INVENTION

In recent years, increasing attention is attracted to the use of a water vapor permeable membrane for humidification or dehumidification. These humidifiers and dehumidifiers incorporating a water vapor permeable membrane have advantages such as being free from maintenance work and power sources for driving them.

Hollow fiber membranes, i.e. water vapor permeable membranes with a hollow structure, are used, for instance, to humidify the barrier membranes of fuel cell stacks. Fuel cells designed to be mounted on automobiles requires humidification for a very large flow volume of air of about 4,000 NL/min. Therefore, hollow fiber membranes for humidification are required to be high in water vapor permeability and hollow fiber membrane strength. Hollow fiber membranes for humidification also need to have gas barrier capability to prevent air leak from hollow fibers, as well as water vapor permeability. To this end, these hollow fiber membranes have a porous structure containing voids with very small diameters and a required water vapor permeability is achieved by applying a pressure. The required air flow volume largely varies depending on the road conditions and the way of driving. For instance, vehicles traveling on urban roads require only a small flow volume, while a large flow volume is required when they are running up a mountain road or accelerated suddenly.

There have been several proposals of hollow fiber membranes that cut off air while selectively allowing water vapor to permeate them.

A wide variety of polymers have been proposed as material for hollow fiber membranes for humidification. An example is a hollow fiber membrane for humidification comprising polyimide resin as membrane material. This membrane is characterized by high heat resistance, high durability and good gas barrier properties. However, it has the disadvantage of poor water vapor permeability.

Hollow fiber membranes for humidification comprising a fluorine-based ion exchange membrane are higher in water vapor permeability and gas barrier capability than hollow fiber membranes for humidification comprising polyimide resin. However, they are not high enough in water vapor permeability to serve practically as hollow fiber membrane for humidification, and they are also low in heat resistance. Furthermore, the hollow fiber membranes themselves will be very expensive.

Hollow fiber membranes for humidification comprising polyetherimide resin have recently been proposed. These are designed to be as high in water vapor permeability as fluorine-based ion exchange membranes, and also high in heat resistance.

In any case, the existing hollow fiber membranes for humidification are intended to have good gas barrier properties, but accordingly they are poor in water vapor permeability, failing to serve adequately as material for humidification.

In a recent proposal concerning membrane material, a spinning solution consisting of polyphenylsulfone resin and hydrophilic polyvinyl pyrrolidone dissolved in a water-soluble organic solvent is used with an aqueous N-methyl-2-pyrrolidone solution as core liquid, and subjected to dry-wet spinning to produce a hollow fiber membrane of porous polyphenylsulfone resin (Patent document 1). It is described, however, that the hollow fiber membrane thus produced is intended to serve as ultrafiltration membrane for oily water separation, and therefore, it is not designed for water vapor permeation.

There is another proposal for a polyphenylsulfone based hollow fiber membrane for humidification (Patent document 2). However, this hollow fiber membrane cannot achieve sufficient humidification performance.

There is another proposal for a polysulfone-based hollow fiber membrane for humidification in which the hollow fiber membrane has an asymmetric structure in which the voids located near one membrane surface have different diameters from those of the voids located near the other membrane, instead of having a uniform size (Patent document 3). However, such an asymmetric structure alone cannot act to develop a sufficient water vapor permeability and will fail to achieve a high humidification performance.

With respect to the relation between the number of voids in a hollow fiber membrane and its strength, on the other hand, the strength of the hollow fiber membrane decreases if the number of voids is increased to enhance the water vapor permeability, while the water vapor permeability decreases if the number of voids is decreased to enhance the strength of the hollow fiber membrane, thus resulting in a relation that requires a trade-off. To solve this problem, the use of a textured yarn commonly called covering yarn to cover a hollow fiber membrane (Patent document 4) and the use of high-strength rods to protect the external face of a hollow fiber module (Patent document 5) have been proposed. The method proposed in Patent document 4 actually can protect part of the hollow fibers by covering the hollow fibers with textured yarns, but it is difficult to increase the strength sufficiently to resist a high flow volume of 4,000 NL/min. In the method proposed in Patent document 5, high-strength rods act too strongly to restrain the gas flow into hollow fibers, leading to performance problems such as inefficient water vapor permeation.

In another proposal, covering yarns as described in Patent document 4 and a high-strength rod as described in Patent document 5 are used together by combining the high-strength rod and the hollow fiber membranes with the covering yarns (Patent document 6). This method is difficult to carry out in an in-line step in the hollow fiber membrane production process, making it necessary to wind the hollow fiber membranes around the high-strength rod in an off-line step, which requires very lengthy operations. Therefore, it is not suitable for a step that handles several thousands to several tens of thousands of hollow fiber membranes. Furthermore, a method in which hollow fiber membranes are arranged around a support yarn to achieve a required strength has been proposed (Patent document 7). This method, however, uses a low-stretchability support yarn passing through the center of a bundle of hollow fiber membranes, which fail to achieve a sufficient resistance to the high flow volume of gas in humidifiers.

LISTING OF DOCUMENTS

Patent Documents
Patent document 1: JP 2001-219043 A
Patent document 2: JP 2004-290751 A
Patent document 3: JP 2007-289944 A
Patent document 4: JP 2004-006100 A
Patent document 5: JP 2004-209418 A
Patent document 6: JP 2004-311287 A
Patent document 7: JP H08-246283 A

SUMMARY OF THE INVENTION

The present invention aims to provide water vapor permeable membranes having both a high water vapor permeability and a low air leakage and hollow fiber membranes comprising said water vapor permeable membranes with a hollow structure. The invention further aims to provide a hollow fiber membrane module that can resist a high flow volume of air while maintaining the high water vapor permeability of said hollow fiber membranes.

The invention provides a water vapor permeable membrane comprising a dense layer and a support layer that are adjacent to each other,
wherein said dense layer contains voids with a length of 0.1 μm or less and said layer has a thickness of 0.1 μm or more and 2 μm or less,
while in said support layer, void (a), i.e. the void with the largest length in the 2 μm thick region measured from the boundary between the dense layer and the support layer into the support layer, has a length of 0.3 μm or more and void (b), i.e. the void with the largest length in the region ranging between 2 μm and 4 μm measured from said boundary into the support layer, has a length of 0.5 μm or more, the length of said void (b) being larger than that of said void (a).

The hollow fiber membrane comprises a water vapor permeable membrane and has a hollow structure.

The hollow fiber membrane unit comprises hollow fiber membranes and a reinforcing yarn, which is a nearly straight fiber, are combined by covering yarns. The hollow fiber membrane module is a hollow fiber membrane module that comprises hollow fiber membranes or hollow fiber membrane units.

The present invention provides a water vapor permeable membrane having both a high water vapor permeability and a low air leakage. Furthermore, the water vapor permeable membrane according to the invention serves to produce hollow fiber membranes and hollow fiber membrane modules that can be used favorably in humidifiers of fuel cell systems.

DETAILED DESCRIPTION OF CERTAIN EMBODIMENTS OF THE INVENTION

Water Vapor Permeable Membrane

The invention provides a water vapor permeable membrane comprising a dense layer and a support layer that are adjacent to each other,
wherein said dense layer contains voids with a void length of 0.1 μm or less and said layer has a thickness of 0.1 μm or more and 2 μm or less,
while in said support layer, void (a), i.e. the void with the largest length in the 2 μm thick region measured from the boundary between the dense layer and the support layer into the support layer, has a length of 0.3 μm or more and void (b), i.e. the void with the largest length in the region ranging between 2 μm and 4 μm measured from said boundary into the support layer, has a length of 0.5 μm or more, the length of said void (b) being larger than that of said void (a).

Figure 2:
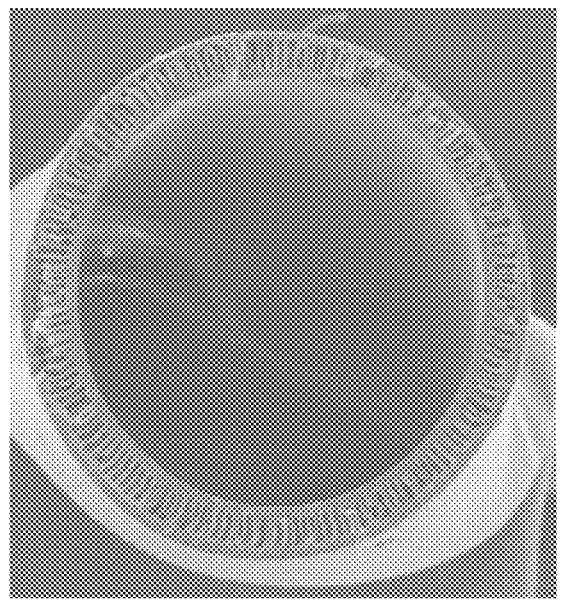
FIG. 2 is a (entire) cross section of a hollow fiber that contains large voids in the through-thickness center portion of a hollow fiber membrane.
Figure 3:
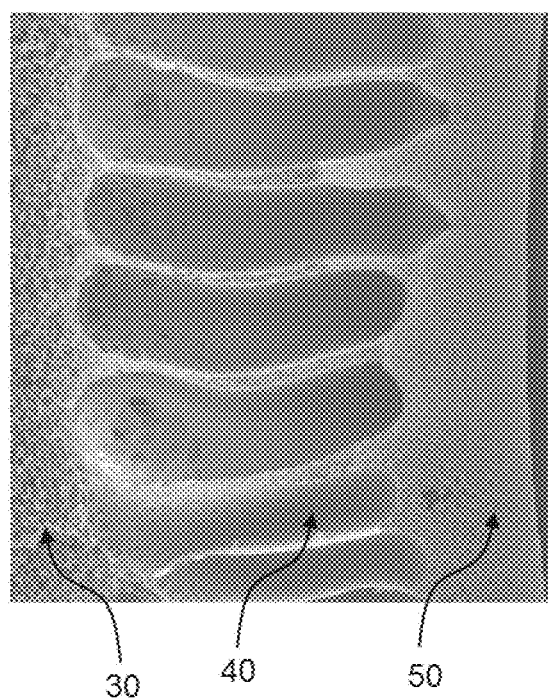
FIG. 3 is a (enlarged) cross section of a hollow fiber that contains large voids in the through-thickness center portion of the hollow fiber membrane.
Figure 8:
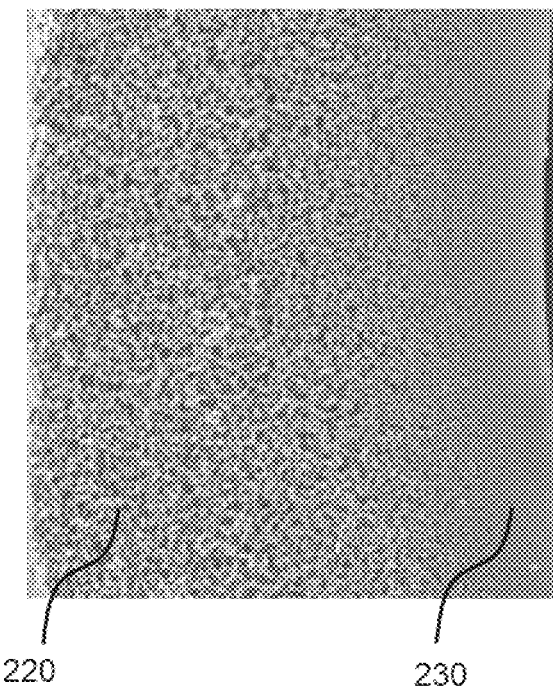
FIG. 8 is a (enlarged) cross section of an asymmetric hollow fiber that contains no large voids in the through-thickness center portion of a hollow fiber membrane.

The water vapor permeable membrane according to the invention typically contains many voids, and the voids located near one surface of the membrane have small lengths while those located closer to the other surface have gradually increasing lengths. Needless to say, some voids located nearer to said one surface may be longer than others located less near to the other surface, but when the membrane is observed as a whole, the length of the voids roughly tends to gradually increase with an increasing distance from one surface towards the other surface. An example of the water vapor permeable membrane according to the invention is given in FIGS. 2 and 3. FIG. 2 is a photograph of a cross section of a hollow fiber membrane comprising a water vapor permeable membrane according to an embodiment of the invention with a hollow structure, severed perpendicularly to the length direction of the hollow fiber. FIG. 3 is an enlargement of a portion of the same membrane as in FIG. 2, observed at a magnification of ×1,000. The inner surface of the hollow fiber membrane is located to the right side while the outer surface of the hollow fiber membrane is located to the left side in the photograph. It is seen from this figure that except for the large voids located in the central portion 40, the void length gradually increases when the voids in the region 30 near the outer surface are compared with those in the region 50 near the inner surface. Another example of the water vapor permeable membrane according to the invention is given in FIG. 8. FIG. 8 is also a photograph of a hollow fiber membrane comprising the water vapor permeable membrane according to an embodiment of the invention with a hollow structure, enlarged at a magnification of ×1,000. Large voids do not exist in the central portion of this water vapor permeable membrane, and the void length gradually increases when the voids in the region 220 near the outer surface are compared with those in the region 230 near the inner surface. Hereinafter, such a state of gradual increase in the void length is referred to as asymmetry.

The void length referred to herein for the invention is defined as the maximum (regardless of the measuring direction) internal dimension of a void (length of a line segment across the void passing through its gravity center) observed in a cross section. The void length corresponds to the distance between polymer backbones. The void length can be determined by cutting the water vapor permeable membrane in the perpendicular direction to the membrane surface (or, in the case of a hollow fiber membrane with water vapor permeability, cutting it in the perpendicular direction to its length direction) and observing the cross section by electron microscopy at a magnification of ×10,000.

The thickness of a water vapor permeable membrane is defined as the distance from one surface to the other surface of the water vapor permeable membrane. The thickness of a hollow fiber membrane is defined as the distance from the inner surface to the outer surface of the hollow fiber membrane.

[Dense Layer]

The water vapor permeable membrane according to the invention has a dense layer and a support layer.

The dense layer referred to herein for invention is defined as described below, and it is considered to serve to control the balance between the water vapor permeability and the air shutoff capability. The water vapor permeable membrane according to embodiments of the invention is characterized by having this dense layer in addition to having said asymmetric structure.

Figure 4:
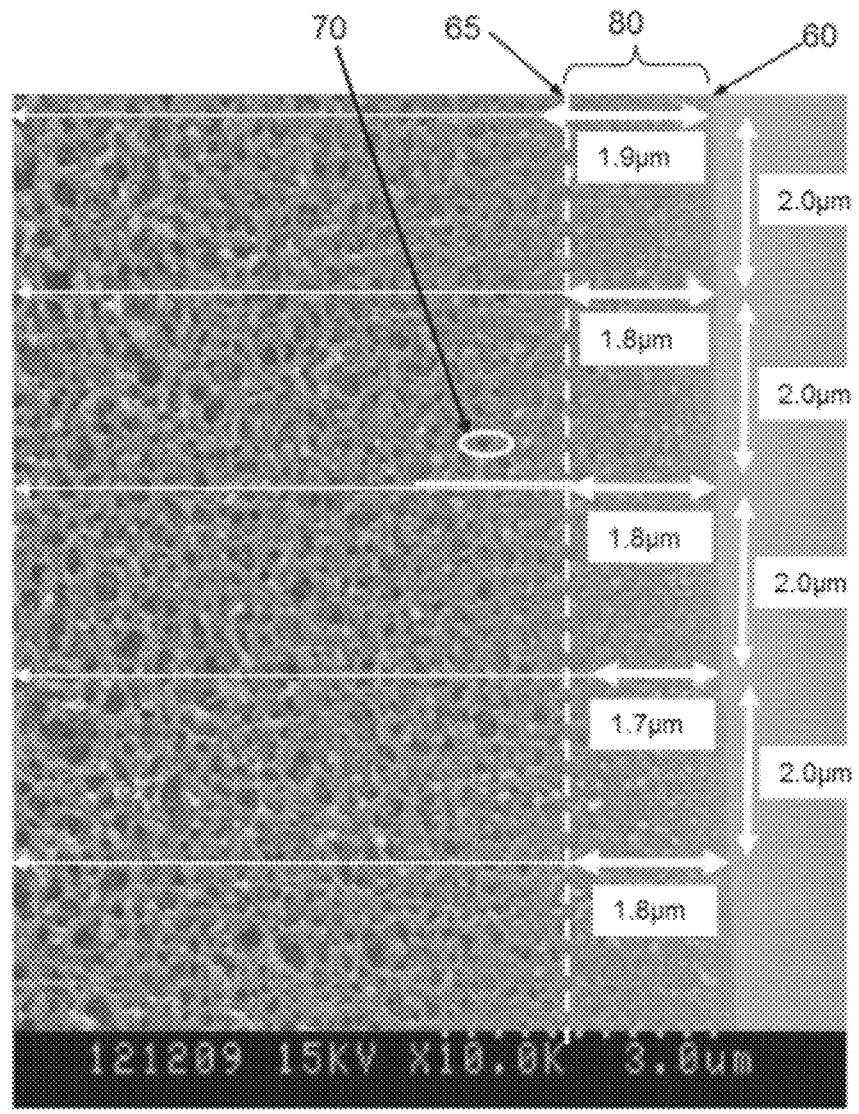
FIG. 4 illustrates a measuring method for the dense layer in a water vapor permeable membrane.

The definition of the dense layer is described below with reference to FIG. 4. After cutting the water vapor permeable membrane in the perpendicular direction to the membrane surface (or, in the case of a hollow fiber membrane, cutting it in the perpendicular direction to its length direction), the cross section is observed by electron microscopy at a magnification of ×10,000. Voids in the cross section are observed to identify the membrane surface 60 near which a larger number of short voids exist than near the other membrane surface. Starting at an arbitrary point in this membrane surface 60, voids adjacent to each other in the perpendicular (thickness) direction to the membrane are compared to determine the distance between the membrane surface 60 and the void with a void length that exceeds 0.1 μm. The length of the void with a void length exceeding 0.1 μm is not included in this distance. Similar measurements are made at additional 4 points located at 2 μm intervals in the parallel direction to the membrane surface 60. The average of the 5 distance measurements thus made is calculated. A virtual plane (hereinafter referred to as boundary plane 65) this average distance away from the membrane surface 60 is assumed, and the dense layer 80 is defined as the region between the membrane surface 60 and the boundary plane 65. Accordingly, the distance between the membrane surface 60 and the boundary plane 65 is the thickness of the dense layer.

This means that the dense layer is a region where voids longer than 0.1 μm are unlikely to exist. The region free from voids longer than 0.1 μm corresponds to a state where polymer chains are aggregated as a result of phase separation reaction during membrane production.

The thickness of the dense layer is 0.1 μm or more and 2 μm or less. As the thickness of the dense layer decreases, the air shutoff capability of the water vapor permeable membrane deteriorates although the water vapor permeability improves. As the thickness of the dense layer increases, on the other hand, the water vapor permeability of the water vapor permeable membrane deteriorates although the air shutoff capability improves. To maintain both a high water vapor permeability and a high air shutoff capability of a water vapor permeable membrane at an appropriate level, it is necessary for the thickness of the dense layer to be 0.1 μm or more and 2 μm or less. The thickness of the dense layer is preferably 0.1 μm or more and 1.5 μm or less, and more preferably 0.1 μm or more and 1.2 μm or less. The method to maintain the thickness of the dense layer in the range of 0.1 μm or more and 2 μm or below will be described later in section [Raw materials].

Support Layer

The support layer as referred to for the invention is the region adjacent to the dense layer with the above-mentioned boundary plane between them. In the support layer, the voids located farther away from the boundary plane have gradually larger lengths. Needless to say, some voids located nearer to the boundary plane may be longer than others located less near to the boundary plane, but when the support layer is observed as a whole, the void length roughly tends to gradually increase as the distance from the boundary plane increases. Thus, the support layer has an asymmetric structure. Specifically, its structure meets the following requirements from (i) to (iii).

(i) Of the voids existing at positions 2 μm or less from the boundary plane between the dense layer and the support layer into the support layer in the thickness direction, the void with the largest void length (hereinafter, referred to as void (a)) has a void length of 0.3 μm or more.

(ii) Of the voids existing at positions 2 μm or more and 4 μm or less from the boundary plane between the dense layer and the support layer into the support layer in the thickness direction, the void with the largest void length (hereinafter, referred to as void (b)) has a void length of 0.5 μm or more.

(iii) The void length of void (b) is larger than the void length of void (a).

The dense layer is composed of aggregated polymer chains, and the existence of voids with a length of 0.3 μm or more at positions 2 μm or less measured in the thickness direction from the dense layer indicates that the polymer chains are lower in coagulation power, resulting in the formation of voids among the polymer chains. At positions 2 μm or more and 4 μm or less away in the thickness direction, furthermore, the existence of voids with a void length of 0.5 μm or more causes a decrease in the resistance to water vapor permeation as compared with the dense layer in which polymer chains are in a coagulated state. Thus, the water vapor permeable membrane can be enhanced in water vapor permeability by controlling the distance in the thickness direction from the dense layer as well as the void length.

The asymmetry of the support layer serves to increase the permeation (diffusion) resistance of the void-containing portion in the water vapor permeable membrane, leading to a higher water vapor permeability. The dense layer is considered to be the portion serving to maintain both a high water vapor permeability and a high air shutoff capability of a water vapor permeable membrane, but it is difficult to achieve a sufficient strength of the water vapor permeable membrane only by the thickness of the dense layer. Thus, the existence of a support layer serves to maintain the strength of the water vapor permeable membrane. The method to produce a support layer having a structure that meets the above requirements (i) to (iii) will be described later in the section headed Raw materials.

Voids (c)

It is preferable that the support layer according to the invention further contains voids (hereinafter, referred to as voids (c)) whose internal dimension measured in the thickness direction of the water vapor permeable membrane is 30% or more and 80% or less of the thickness of the water vapor permeable membrane. It is more preferably 35% or more and 75% or less, and particularly preferably 40% or more and 70% or less. If the support layer has a homogeneous structure (symmetric structure) containing voids with roughly the same length, it will be difficult to maintain both a high water vapor permeability and a high air shutoff capability. Thus, the support layer is made asymmetric with the aim of decreasing the resistance to water vapor permeation (diffusion) to increase the water vapor permeability, but nevertheless, the water vapor permeability may be insufficient if the dense layer causes a large increase in the air shutoff capability. A support layer containing voids (c) makes it easy to achieve both a high water vapor permeability and a high air shutoff capability.

It is preferable that the number of voids (c) is two or more per every 9,500 $\mu m^2$ area of the support layer. It is more preferably 4 or more. If the number of voids (c) is less than 2, the water vapor permeability will not be improved in some cases. The method to form voids (c) will be described later in the section headed Raw materials.

Finger Voids Structure

Figure 1:
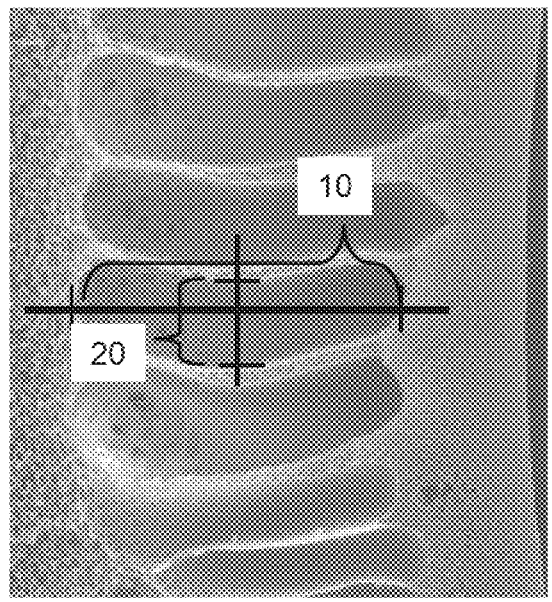
FIG. 1 illustrates an example method for measuring the width to length ratio of finger voids.

It is preferable that voids (c) are so-called finger voids. A finger void structure is, for instance, a thumbmark-like void as seen in FIG. 1, and its maximum internal dimension (namely, the void length) is in the thickness direction of the water vapor permeable membrane.

With respect to the shape of such finger voids, if the line dividing a finger void equally into two in the thickness direction is denoted as axis X 10 while the perpendicular bisector of axis X 10 is denoted as axis Y 20, it is preferable that the length of axis X 10 is 1.1 times, more preferably 1.5 times, the length of axis Y 20. The method to form a finger void structure will be described later in the section headed Raw materials.

Hollow Fiber Membrane

The hollow fiber membrane comprises a water vapor permeable membrane processed into a hollow structure. Similar to the water vapor permeable membrane, the hollow fiber membrane has both a high water vapor permeability and an air shutoff capability. A dense layer may be formed either to the inner surface side or to the outer surface side in a hollow fiber membrane, and either is selected depending on the purpose of the hollow fiber membrane.

With respect to the hollow fiber membrane according to the invention, it is preferable that when air is fed to the hollow in a hollow fiber at a linear velocity of 1,000 cm/sec, the water vapor permeability coefficient is 0.4 g/min/cm$^2$/MPa or more. It is more preferably 0.45 g/min/cm$^2$/MPa or more. The water vapor permeability coefficient is an index representing the performance in water vapor permeation. If the water vapor permeability coefficient is 0.4 g/min/cm$^2$/MPa or more, it will be possible to perform optimum humidification for a fuel cell stack, supply water and oxygen stably, and allow the electrolyte film in the fuel cell stack to work adequately.

When an air pressure of 50 kPa is applied from inside the hollow in a hollow fiber membrane in the outward direction, it is preferable that the air leakage from the hollow fiber is 0.1 L/min or less. It is more preferably 0.01 L/min or less. This is because the water vapor permeation performance will virtually decrease if an air leakage of more than 0.1 L/min takes place when air is caused to pass the hollow fiber membrane from inside to outside or from outside to inside.

It is preferable that the size of hollow fiber is such that the inside diameter of the hollow fiber is 300 µm or more and 1,500 µm or less. If the inside diameter of the hollow fiber is less than 300 µm, the hollow fiber membrane can be broken by an increased pressure as a high flow volume of air passes from the air inlet to the outlet. If the inside diameter of the hollow fiber membrane is more than 1,500 µm, a module composed of such hollow fibers can suffer nonuniform air flows, preventing the hollow fiber membranes to work effectively.

It is preferable that the thickness of a hollow fiber membrane is 50 µm or more and 200 µm or less. If the membrane thickness is less than 50 µm, the hollow fiber membrane can be broken as air is fed at a high air flow rate. If voids (c) exist in the central portion in the cross section of a hollow fiber membrane, in particular, this tendency will become more noticeable because the rupture strength of the hollow fiber membrane decreases. If the membrane thickness is more than 200 µm, the structure cannot be controlled stably during production of the hollow fiber membrane, making it difficult for voids in the hollow fiber membrane to be formed with a high reproducibility.

It is preferable that the hollow fiber membrane has a collapse resistance strength of 0.02 or more and 0.07 or less. It is more preferably 0.03 or more and 0.05 or less. Here, the resistance strength is defined as the value calculated by the following equation.

$$\text{Collapse resistance strength} = (\text{thickness of hollow fiber membrane (µm)}/\text{inside diameter of hollow fiber membrane (µm)})^3$$

If the collapse resistance strength is less than 0.02, the strength of the hollow fiber membrane is likely to become so low that the membrane cannot resist a normal operating pressure. If the collapse resistance strength is more than 0.07, the membrane thickness will be large while the inside diameter will be small, possibly making smooth water vapor permeation impossible.

Hollow Fiber Membrane Unit

The hollow fiber membrane unit comprises hollow fiber membranes and a reinforcing yarn, which is a nearly straight fiber, are combined by covering yarns. Here, hollow fibers with a low tensile strength are combined with a reinforcing yarn to increase the strength.

The term "nearly straight" in said nearly straight fiber refers to a crimp-free state of observed fiber. A yarn in this state is very low in stretchability.

The term "covering" refers to winding a set of two or more rod-like or thread-like objects brought together with threads or bands so that the bundled state will be maintained. With respect to the method for winding it, two or more threads or bands may be put around it or one thread or band may be put helically around it. What is essential is to maintain the rod-like or thread-like objects bundled together. Said covering yarn is the yarn used for said covering.

Figure 11:
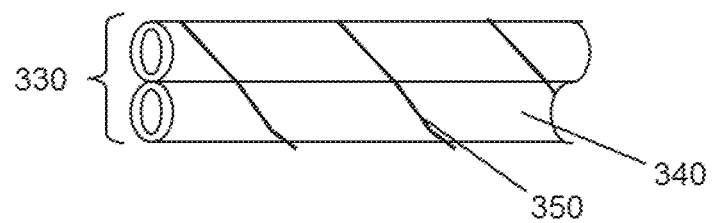
FIG. 11 illustrates a hollow fiber membrane unit consisting of hollow fiber membranes and covering yarns.
Figure 12:
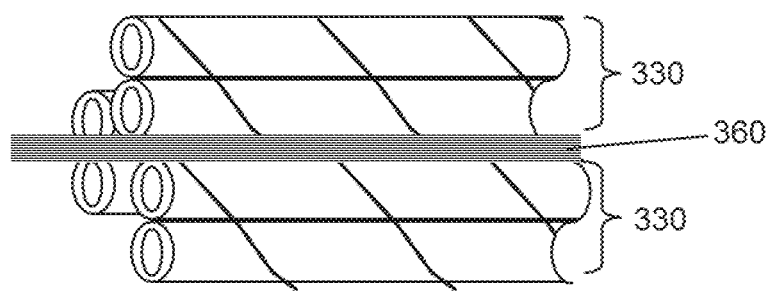
FIG. 12 illustrates a hollow fiber membrane unit consisting of hollow fiber membranes, covering yarns, and a reinforcing yarn.
Figure 13:
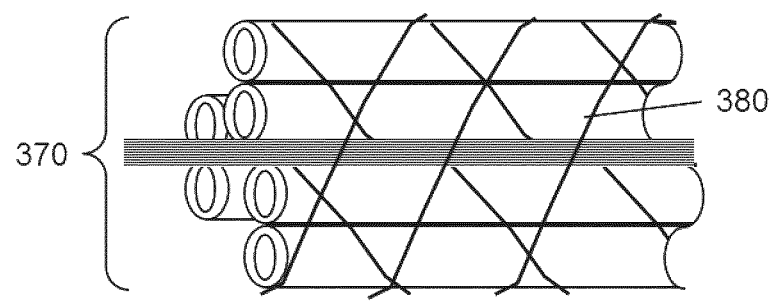
FIG. 13 illustrates a hollow fiber membrane unit consisting of hollow fiber membranes, covering yarns, a reinforcing yarn, and double covering yarns.

An embodiment of the hollow fiber membrane unit according to the invention is described in detail below with reference to drawings. First, two or more hollow fiber membranes 340 are brought together, and covered by putting a covering yarn 350 helically around the circumference. Thus, a set of covered hollow fiber membranes 330 is prepared (FIG. 11). Then, a reinforcing yarn 360 of a material different from that of the hollow fiber membranes is combined with the covered hollow fiber membranes 330 (FIG. 12). While keeping this state, covering yarns 380 are put helically around the circumference for additional covering (FIG. 13). Thus, a hollow fiber membrane unit 370 is prepared. In this preparation procedure, covering is performed twice, and the state at the stage illustrated in FIG. 11 is referred to as single covering, the covering yarn 350 as single covering yarn, the state at the stage illustrated in FIG. 13 as double covering, and the covering yarn 380 as double covering yarn.

Needless to say, instead of first preparing the covered hollow fiber membrane 330, a reinforcing yarn and uncovered hollow fiber membranes may be brought together and the covering procedure is carried out only once to produce a hollow fiber membrane unit.

Reinforcing Yarn

The material of the reinforcing yarn, namely the nearly straight fiber, to be used for the invention is preferably a fiber that is commonly used such as chemical fiber, metal fiber, and glass fiber. Specifically, they include, for instance, rayon, nylon, polyester, aramid fiber, carbon fiber, polyphenylene sulfide fiber, polyether ketone fiber, polyimide fiber, stainless steel metal fiber, and glass fiber. Of these, polyphenylene sulfide fiber is used favorably from the viewpoint of heat resistance and moist heat resistance.

To serve for the reinforcement of hollow fiber membranes, the reinforcing yarn preferably has an initial elastic modulus 10 times or more the initial elastic modulus of the hollow fiber membranes. It is more preferably 20 times or more. This is because materials lower in initial elastic modulus than the hollow fiber membranes, if used as reinforcing yarn, will not always serve for the reinforcement effectively since porous membranes, which are relatively low in strength, are used for the hollow fiber membranes in order to increase the permeation and diffusion performance. Here, the initial elastic modulus is defined as the elastic modulus measured by using a tensile testing machine.

If a textured yarn, such as crimped yarn, is used as the fiber to reinforce the hollow fiber membranes, it will be difficult to maintain a tensioned state when the hollow fiber membrane unit is wound up. Then, the fibers will be stored in a loosened state in the hollow fiber membrane unit. Such fibers in a loosened state cannot resist the pressure of gas of a high flow volume, leading to a poor reinforcing effect. Therefore, the fibers to be used to reinforce the hollow fiber membranes must be in a nearly straight form.

The stretchability of a reinforcing yarn is preferably 1% or less. It is more preferably 0.8% or less. If the stretchability is more than 1%, the fiber is regarded as textured yarn, and cannot be expected to have a high resistance to the pressure of gas of a high flow volume. Here, the strectchability is measured by hanging a fiber specimen in an unweighted state, applying a weight of 0.01 g per dtex of the fiber, and calculating the ratio of the difference between the length of the weighted fiber specimen and the length of the unweighted fiber specimen.

The fineness of the reinforcing yarn is preferably 10,000 dtex or less. If the fineness is more than 10,000 dtex, the yarn is stiff and difficult to wind up in an in-line step. If yarn-making in an in-line step is difficult, the production efficiency will decrease. Here, the fineness is the weight of 10,000 m of the fiber.

The thickness of the reinforcing yarn (fiber diameter) is preferably smaller than that of a hollow fiber membrane. If the diameter of the yarn is larger than that of a hollow fiber membrane, the membrane area of the hollow fiber membrane will decrease, resulting in a decrease in the permeation and diffusion performance of the membrane. The fiber diameter as referred to for reinforcing yarns is measured for one tow (thread) of multifilament fibers or for one monofilament.

Covering Yarn

Unlike reinforcing yarns, it is preferable that covering yarns are one or more selected from the group of crimped, textured or spun yarns that are bulky and stretchable. If these yarns are used as said covering yarns, the hollow fiber membrane unit production can be carried out in an in-line step without causing damage to the hollow fiber membrane when winding the covering yarns helically around the hollow fiber membrane. Specifically, the stretchability of the fiber is preferably 1% or more. There are no specific limitations on the material of said covering yarn, and usable examples include textured yarns of polyester.

Supplementary Yarn

Bulky, stretchable yarns such as crimped, textured or spun yarns can serve to enhance the bulkiness of a hollow fiber membrane unit when they are combined with the hollow fiber membranes. They are called supplementary yarns. If a hollow fiber membrane module is low in module filling factor and has such a shape that the reinforcing yarns have to be high in stretchability, the use of supplementary yarns works to improve the bulkiness of the hollow fiber membrane unit and to reduce the required stretchability of the reinforcing yarns.

Hollow Fiber Membrane Module

As in the case of generally known hollow fiber membrane modules, the hollow fiber membrane module is produced by putting more than one hollow fiber membranes or hollow fiber membrane units in a tubular case, followed by fixing the ends of the hollow fiber membranes or hollow fiber membrane units with an adhesive.

Figure 14:
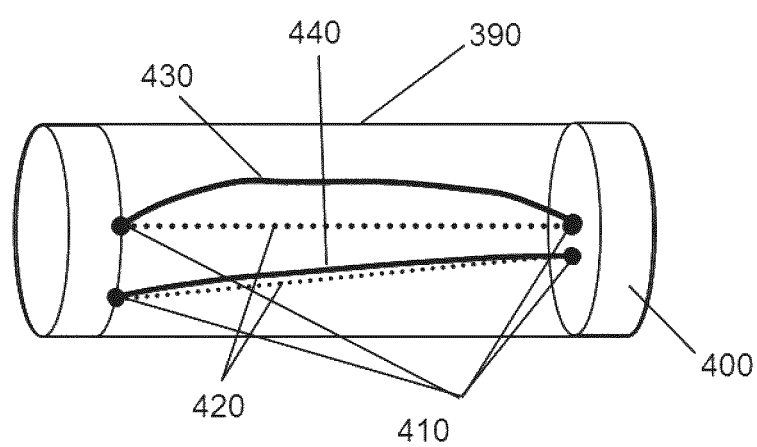
FIG. 14 illustrates conditions of reinforcing yarns in a hollow fiber membrane unit.

For the hollow fiber membrane module according to the invention, it is preferable that the fiber length from one adhesion point to the other adhesion point of each reinforcing yarn in the module is 102% or less of the minimum distance between one adhesion point to the other adhesion point. It is more preferably 101% or less. Here, an adhesion point is the contact point between the reinforcing yarn and the adhesive material that fix either end of the hollow fiber membrane module. It is described more specifically below with reference to FIG. 14. Reinforcing yarns 430 and 440 and an adhesive 400 are illustrated. Reinforcing yarns 430 and 440 and the adhesive material 400 come in contact at the adhesion points 410. The line 420 shows the minimum distance between the adhesion points 410. In FIG. 14, the reinforcing yarn 430 is slack while the reinforcing yarn 440 is taut. If the fiber length is more than 102% of the minimum distance, it means that the reinforcing yarn is in a slack state in the module. Slackness of the reinforcing yarns has the same effect as an increased stretchability of the reinforcing yarns and sometimes causes a decrease in the capability for resisting a high flow volume of air.

Raw Materials

There are no specific limitations on the raw materials to constitute a hollow fiber membrane, and usable ones include polyamide, polyimide, polyphenyl ether, and polysulfone. In particular, polysulfone is preferable. This is because polysulfone is a highly heat resistant polymer, and furthermore, polysulfone designed for use as engineering plastics is a highly versatile polymer and available at relatively low price.

It is preferable that the hollow fiber membrane contains a hydrophilic polymer. Examples of said hydrophilic polymers include polyalkylene oxide, polyvinyl alcohol, polyethylene glycol, and polyvinyl pyrrolidone. In particular, hydrophilic polymers with a glass transition point higher than 150° C. are high in heat resistance and used favorably as material for humidifiers of fuel cell systems. Polyvinyl pyrrolidone is particularly preferable because it has a high glass transition point of 180° C.

The available polyvinyl pyrrolidone products that are useful for addition as a hydrophilic polymer include those with a weight average molecular weight of about 6,000 (equivalent to K-15) to 1,200,000 (equivalent to K-90). It is preferable that polyvinyl pyrrolidone is added up to a content of 20 mass % or more and 100 mass % or less per 100 mass % of polysulfone resin. It is more preferably 30 mass % or more and 70 mass % or less. If it is less than 20 mass % relative to polysulfone resin, the resulting membrane will not have enough hydrophilicity, and will be low in affinity with water vapor, leading to poor suitability for humidification. If it is more than 100 mass %, the hollow fiber membrane will be poor in strength, possibly leading to difficulty in membrane production.

The important points for the methods to be used for producing a dense layer with a thickness of 0.1 μm or more and 2 μm or less include using, as a core liquid, a solution that can aggregate or coagulate the raw material solution for membrane production and decreasing the viscosity of the raw material solution for membrane production by maintaining the base polymer concentration at a low level. A solution that can cause aggregation or coagulation is such a solution that acts as a poor solvent to the raw material solution for membrane production and insoluble in the raw material solution for membrane production. In the membrane production step, a dense layer is formed by bringing a poor solvent into contact with the raw material solution for membrane production immediately after the raw material solution for membrane production is discharged from the nozzle. However, it is likely that when a poor solvent is used alone, the polymer can undergo very rapid aggregation to make membrane production difficult, and therefore, it is preferable to use a solution that consists of a poor solvent mixed with a solvent (good solvent) that can dissolve the polymer.

It is preferable that the concentration of the base polymer in the raw material solution for membrane production is 10 mass % or more and 25 mass % or less of the total mass of the raw material solution for membrane production. It is more preferably 15 mass % or more and 20 mass % or less. If the base polymer has a concentration of less than 10 mass %, the resulting dense layer will be too thick, leading to a low water vapor permeability. It is preferable that the raw material solution for membrane production has a viscosity of 5 to 30 poise, more preferably 8 to 15 poise. If the base polymer has a concentration of more than 30 mass %, the resulting dense layer will be too thick, leading to a low water vapor permeability. If it is less than 5 poise, the dense layer is likely to be too thin, leading to a soft hollow fiber membrane that is low in strength.

To produce a support layer that meets said structural requirements (i) to (iii), it is preferable to use, as a core liquid, a solution that is high in diffusibility in the raw materials for membrane production. The use of a low-diffusibility solution as core liquid will lead to difficulty in accurate control of the void length, making it impossible to produce membranes. Furthermore, it is necessary to control the viscosity of the raw material solution for membrane production, viscosity of the core liquid, and the condensability of the raw material solution for membrane production and the core liquid.

For instance, if the raw material solution for membrane production has a high viscosity, the core liquid has a low diffusion speed in the raw material solution for membrane production, and the growth rate of voids will be low, leading to a small void length, during the step of void formation in the water vapor permeable membrane. A similar void growth is likely to take place when the core liquid is viscous. If a highly agglomerative core liquid such as water is used, furthermore, agglomeration can takes place only at the surface that is in contact with the core liquid, possibly leading to the formation of large voids near the membrane surface that is not in contact with the core liquid.

This means that an appropriate design for the raw material solution for membrane production and an appropriate design for the core liquid to control the phase separation rate is needed to ensure appropriate control of the size of voids in the support layer.

To form voids (c) or finger void structures in the support layer, it is also necessary to achieve an appropriate design for the raw material solution for membrane production and an appropriate design for the core liquid to control the phase separation rate to control of the growth rate of voids.

Specifically, the viscosity of the raw material solution for membrane production is preferably 5 to 30 poise, and more preferably 8 to 15 poise, during the membrane production. If the raw material solution for membrane production has a viscosity of more than 30 poise, it will be some times impossible to produce voids (c) or finger void structures. If the raw material solution for membrane production has a viscosity of less than 5 poise, voids will be larger in the neighborhood of the membrane surface, and in an extreme case, voids reach the membrane surface, leading to a low-strength membrane liable to holes at the membrane surface. Even when the same polymer species is used, the viscosity of the raw material solution for membrane production will be high if the polymer material used has a high molecular weight, while the viscosity will be low if the polymer material has a low molecular weight. The viscosity also changes with the content. It is necessary to select an appropriate polymer type, polymer molecular weight, and polymer content so that the raw material solution for membrane production has a viscosity in the range of 5 to 30 poise.

With respect to the content of the solvent in the core liquid, if an organic solvent (good solvent: aprotic polar solvent such as dimethyl formamide, dimethyl acetamide, and N-methyl-2-pyrrolidone) that dissolves the polymer contained in the raw material solution for membrane production accounts for a large portion, agglomeration can take place only slowly during the membrane production from the polymer, leading to difficulty in the formation of voids (c) and finger void structures. If a solvent (poor solvent) that is not soluble in the raw material solution for membrane production accounts for a large portion, rapid agglomeration is caused by the core liquid and the raw material solution for membrane production and voids (c) and finger void structures will be formed easily. This means that the formation of voids (c) and finger void structures can be controlled by using an appropriate solvent in the core liquid and adjusting its content. It is preferable that the concentration of a good solvent in the core liquid is 20 mass % or more and 80 mass % or less.

The size of voids can also be controlled by combining the raw material solution for membrane production with a low-viscosity core liquid, such as water, low-viscosity solvent, and a solution of water and a low-viscosity solvent, along with a high-viscosity infusion liquid, such as a solvent containing dissolved glycerin, PVP or other polymers.

Production method for hollow fiber membrane and hollow fiber membrane unit Specifically, the hollow fiber membrane and the hollow fiber membrane unit according to the invention can be produced as described below, but it should be understood that the invention is not limited thereto.

The hollow fiber membrane is produced by a water vapor permeable membrane production method comprising a step for allowing a raw material solution for membrane production and a core liquid to be discharged from an orifice-type bicylindrical nozzle to produce a membrane with a hollow structure, a step for rinsing it with warm water, and a step for winding it up after the rinsing step. Furthermore, it is preferable that the wind-up step is followed by a step for drying at 40° C. or more and 170° C. or less for 30 minutes or more using a dry-heat drier.

The hollow fiber membrane according to the invention can be prepared from polysulfone resin. Hollow fiber membranes of polysulfone resin are described below as an example. Commercial products of polysulfone can be used for the invention without any modification. Such products include, for instance, UDEL P1700 and UDEL P3500 supplied by Solvay.

A raw material solution for membrane production comprising polysulfone resin as membrane formation component can be produced by adding hydrophilic polyvinyl pyrrolidone, water-soluble organic solvent, and water to polysulfone resin. An aprotic polar solvent such as dimethyl formamide, dimethyl acetamide, and N-methyl-2-pyrrolidone is used as said water-soluble organic solvent.

It is preferable that the concentration of the polysulfone resin in the raw material solution for membrane production is 10 mass % or more and 25 mass % or less. It is more preferably 15 mass % or more and 20 mass % or less. If the polysulfone concentration is less than 10 mass %, membrane production is likely to be difficult because of insufficient hollow fiber strength. If the polysulfone concentration is more than 25 mass %, cyclic dimers contained in the polysulfone can cause the raw material solution for membrane production to cloud and the pressure will rise during the membrane production, possibly making it difficult to produce a membrane. If the polysulfone concentration is less than 10 mass % or more than 25 mass %, furthermore, it can be impossible to produce a hollow fiber membrane containing voids with an intended void length.

Then, the raw material solution for membrane production is discharged from the outer tube of the orifice-type bicylindrical nozzle. During this step, a core liquid such as a liquid mixture of a good solvent and a poor solvent for polysulfone or a single-component liquid of a poor solvent for polysulfone is discharged from the inner tube to achieve a hollow fiber structure.

The raw material solution for membrane production thus discharged is caused to pass through a 350 mm dry-air portion at a temperature of 30° C., followed by being coagulated in a coagulation solution. The coagulated hollow fiber membrane is then rinsed with warm water at 40° C. or more and 90° C. or less, and wound up. If the rinsing temperature is less than 40° C., organic solvent etc. may not be removed sufficiently, allowing eluted materials from the hollow fiber membrane to have some influence during use. If the rinsing temperature is more than 90° C., the hydrophilic polymers may be removed excessively, leading to a hollow fiber membrane with a low hydrophilicity.

Subsequently, drying is performed to heat-set the membrane to achieve an intended void size, thus producing a hollow fiber membrane. This heat setting is intended to decrease the void size by drying the hollow fiber membrane in a wet state. The hollow fiber membrane subjected to this processing will not require additional moisture retention treatment (glycerin treatment or water filling).

A preferable hollow fiber membrane heat-setting method is cutting the hollow fiber membrane to provide bundles of several hundreds to several thousands of membranes and drying them at 40° C. or more and 170° C. or less for 30 minutes or more in a dry-heat drier. It is more preferably 50° C. or more and 170° C. or less, and more preferably 50° C. or more and 150° C. or less.

If the drying temperature is less than 40° C., the drying step will take a long time and the temperature, hence the void size, will be difficult to control depending on the external atmosphere. If the drying temperature is more than 170° C., particularly when polysulfone is used, the hollow fiber membranes may suffer damage as the temperature comes closer to the glass transition point. The drying time is preferably 30 minutes or more. It is more preferably 5 hours or more. No upper limits are specified here on the drying time, but it is preferably less than 72 hours in view of the working efficiency. If the drying time is less than 30 minutes, moisture may not be removed completely from the hollow fiber membranes, leaving some portions that are not heat set. In this case, portions containing shrunk voids and portions containing unshrunk voids coexist in the hollow fiber membranes, making it impossible for the hollow fiber membranes to prevent air leakage.

Subsequently, a textured yarn (single covering yarn) is wound helically around the circumference of one or more hollow fiber membranes in an in-line step for covering (single covering). Then, the covered hollow fiber membranes are combined with a reinforcing yarn and they are covered again (double covering) by winding textured yarns (double covering yarns) helically around them in an in-line step. Thus, a hollow fiber membrane unit is produced, and finally the hollow fiber membrane unit is wound up. Here, the term "in-line" indicates that the hollow fiber membrane unit is completed in a series of continuous steps from the discharging from the nozzle to the winding-up of the hollow fiber membranes.

EXAMPLES (1) Observation of Cross Section of Membrane

After cutting a hollow fiber membrane in the perpendicular direction to the length direction (or, in the case of a water vapor permeable membrane, cutting it in the perpendicular direction to the membrane surface), the cross section is observed by electron microscopy (using S800 scanning electron microscope supplied by Hitachi, Ltd.) at a magnification of ×1,000. This is intended to roughly determine whether voids exist in the membrane, whether the void length gradually increases with an increasing distance from one surface of the membrane toward the other, whether there are voids with a void length of 30% or more of the membrane thickness, and whether finger void structures exist.

(2) Measurement of Thickness of Dense Layer

The method for measuring the thickness of the dense layer is described below with reference to FIG. 4. A portion close to one surface where voids with smaller void lengths are, found in the observation of paragraph (1) is further observed by electron microscopy (using S800 scanning electron microscopy supplied by Hitachi, Ltd.) at a magnification of ×10,000. Starting at an arbitrary point in the membrane surface 60, voids are observed in the perpendicular (thickness) direction to the membrane surface to determine the distance from the membrane surface 60 to the void with a void length exceeding 0.1 μm. The length of the void with a void length exceeding 0.1 μm is not included in this distance. Similar measurements are made at additional 4 points located at 2 μm intervals in the parallel direction to the membrane surface 60.

The average of the 5 distance measurements thus made is calculated. A virtual boundary plane 65 is assumed to exist at a position this average distance away from the membrane surface 60. The distance between the membrane surface 60 and the boundary plane 65 is defined as the thickness of the dense layer.

(3) Measurement of Void Length of Void (a) and Void (b)

Figure 5:
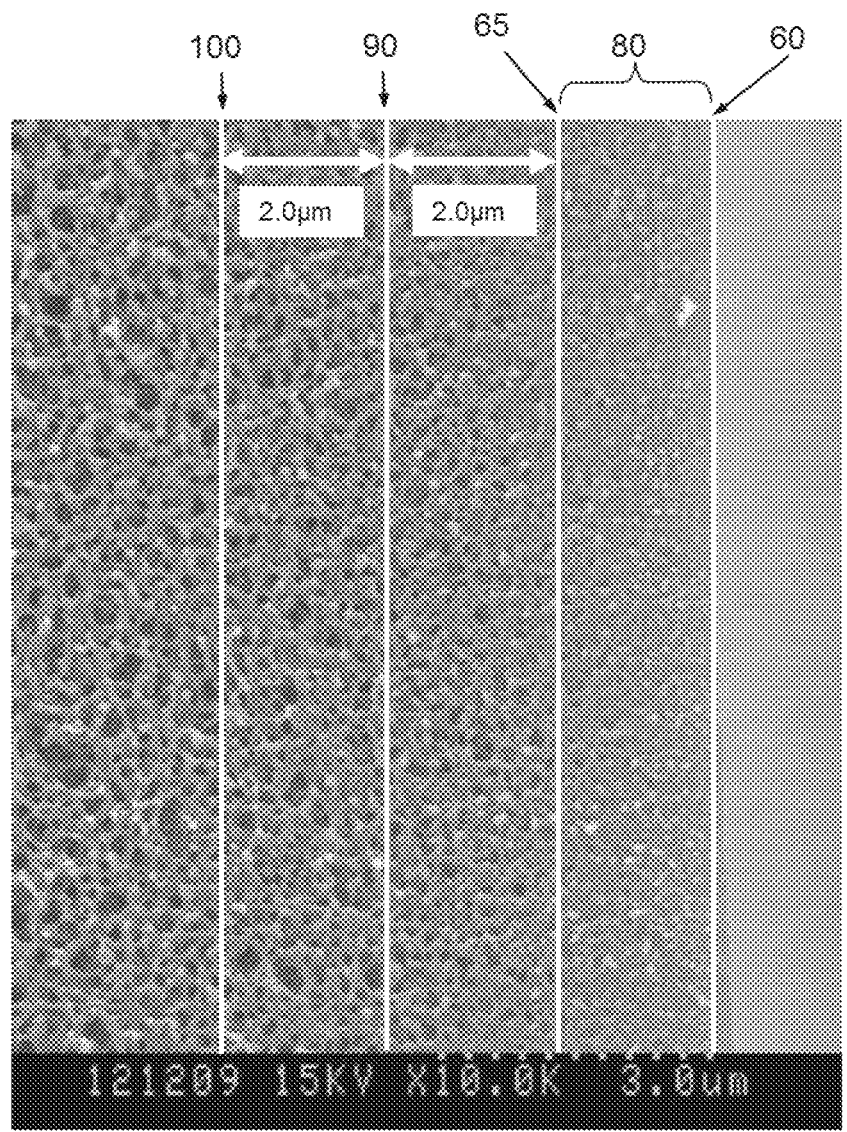
FIG. 5 illustrates boundary lines specified distances away from the dense layer in a water vapor permeable membrane.

The method for measuring the void length of void (a) and void (b) is described below with reference to FIG. 5.

The portion observed in paragraph (2) is observed similarly by electron microscopy at a magnification of ×10,000. A boundary line 90 is assumed at a position 2 μm away in the thickness direction from the boundary plane 65. Five voids that can be identified visibly are selected arbitrarily from the region between the boundary plane 65 and the boundary line 90. Of these five voids, the void with the largest length is referred to as void (a). The, a boundary line 100 is assumed at a position 4 μm away in the thickness direction from the boundary plane 65. Five voids that can be identified visibly are selected arbitrarily from the portion between the boundary plane 90 and the boundary line 100. Of these five voids, the void with the largest length is referred to as void (b).

(4) Measurement of Void Length of Void (C) and Finger Void Structure

After cutting a hollow fiber membrane in the perpendicular direction to the length direction (or, in the case of a water vapor permeable membrane, cutting it in the perpendicular direction to the membrane surface), the cross section is observed by electron microscopy (using S800 scanning microscope supplied by Hitachi, Ltd.). The void length of the voids in the field of view is measured. If there are voids with a void length equivalent to 30% or more of the thickness of the hollow fiber membrane, they are referred to as voids (c). Further observation is performed to check if they are in the form of finger void structures.

(5) Measurement of Water Vapor Permeability Coefficient

Figure 6:
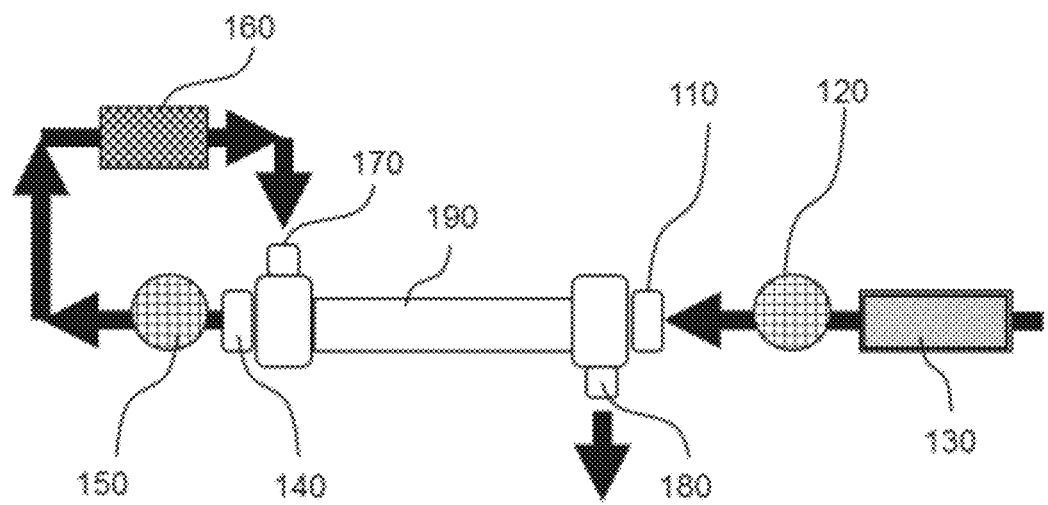
FIG. 6 illustrates a method for measuring the water vapor permeability.

The method for measuring the water vapor permeability coefficient is described below with reference to FIG. 6. Three hollow fiber membranes are passed through a stainless steel tube with a diameter of 6 mm and both ends are fixed with an adhesive to prepare a stainless steel tube module with an effective length of 0.1 m (hereinafter, referred to as mini-module 190). At a temperature of 85° C., a dry gas (sweep gas) is passed through the inside of the hollow fiber membrane from the sweep gas inlet 110 to the sweep gas outlet 140. The gas coming out from the sweep gas outlet 140 is humidified in the humidifier 160 and the humidified wet gas (offgas) is passed along the outside of the hollow fiber membrane from the offgas inlet 170 toward the offgas outlet 180. Thus, gas is allowed to flow in a one-pass cross flow. The linear rate inside the hollow fiber membrane is adjusted to 1,000 cm/sec with an air meter 130. Here, the temperature and humidity of gas getting in the sweep gas inlet 110 and coming out from the sweep gas outlet 140 are measured at the measuring position 120 and the measuring position 150. The amount of permeated water vapor (g) is determined from these measurements and it is then divided by the sweep gas supply duration (min), the effective area of the hollow fiber (cm$^2$), and the sweep gas supply pressure (Mpa) to calculate the water vapor permeability coefficient. When sweep gas is passed inside a hollow fiber, the effective area of a hollow fiber is defined by the following equation: inside diameter of hollow fiber (cm)×circumference-to-diameter ratio×length of hollow fiber (cm).

A membrane is acceptable as material for the humidifier of a fuel cell system if its water vapor permeability coefficient is 0.4 g/min/cm$^2$/MPa or more and it is regarded as excellent if it is 0.45 g/min/cm$^2$/MPa or more.

(6) Measurement of Air Leakage

Figure 7:
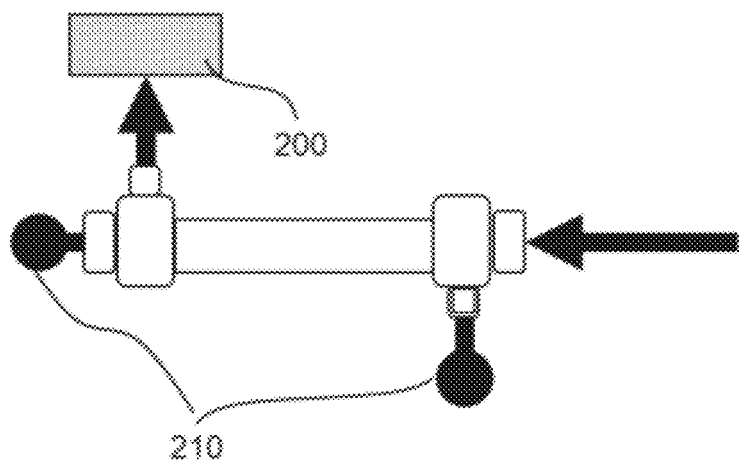
FIG. 7 illustrates a method for measuring the air leakage.

The method for measuring the air leakage is described below with reference to FIG. 7. The mini-module 190 prepared in paragraph (5) is used. The mini-module 190 is dried in a dryer at 40° C. for 24 hours to remove moisture from the module. Then, the sweep gas outlet 140 and the offgas outlet 180 is closed with a stopper 210. Air is supplied at a pressure of 50 kPa from the sweep gas inlet 110 into the hollow fiber.

At this point, the leakage of air flowing out of the hollow fiber is measured with a flow meter 200 connected to the offgas inlet 170. From this flow rate, the air leakage from one hollow fiber membrane is determined.

A membrane is acceptable as material for the humidifier of a fuel cell system if the air leakage is 0.1 L/min or less, and it is regarded as excellent if it is 0.01 L/min or less.

(7) Measurement of Fiber Diameter of Hollow Fiber Membrane

From a bundle of hollow fiber membranes, 16 hollow fiber membranes are taken out randomly. The external shape of each hollow fiber membrane is measured with a laser displacement gauge (LS5040T, supplied by Keyence) and the average is taken as the outside diameter of the hollow fiber membranes.

The thickness of the hollow fiber membranes is measured using a ×1,000 microwatcher lens (VH-Z100, supplied by Keyence).

Two times the thickness of the hollow fiber membrane is subtracted from the outside diameter of the hollow fiber membrane to give the inside diameter of the hollow fiber membrane.

(8) Measurement of Average Aperture Area Diameter in Dense Layer of Hollow Fiber Membrane Using Nano-Perm Porometer supplied by Seika Corporation, the average aperture area diameter of the dense layer in a hollow fiber membrane is determined from the helium gas permeability of the hollow fiber membrane.

(9) Measurement of Initial Elastic Modulus

Figure 9:
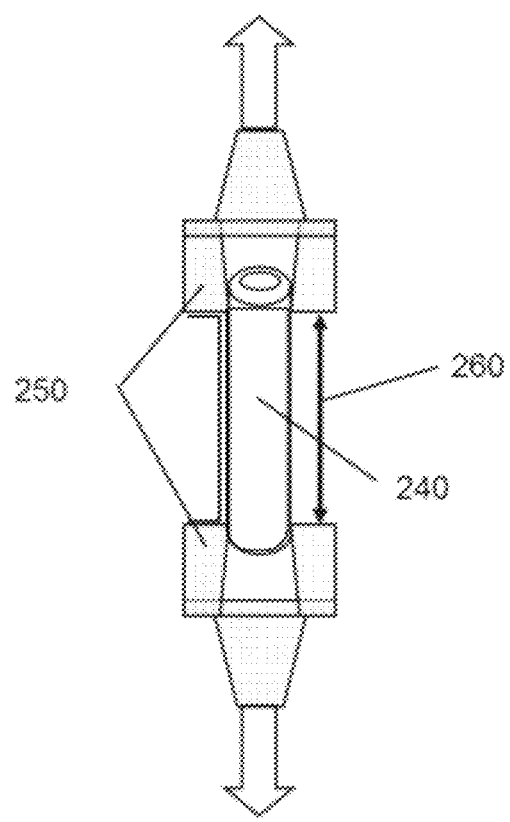
FIG. 9 illustrates the test for measuring the initial elastic modulus of a hollow fiber membrane.

The method for measuring the initial elastic modulus of a hollow fiber membrane is described below with reference to FIG. 9. A Tensilon tester (RTM-100, supplied by Orientec) equipped with a 500 gf load cell is used for the measurement. A hollow fiber membrane 240 with a hollow fiber membrane specimen length 260 of 50 mm is pulled at a tension speed of 50 mm/min. As described in FIG. 9, the specimen length is the distance between the clamps 200 instead of the length of the specimen itself.

Figure 10:
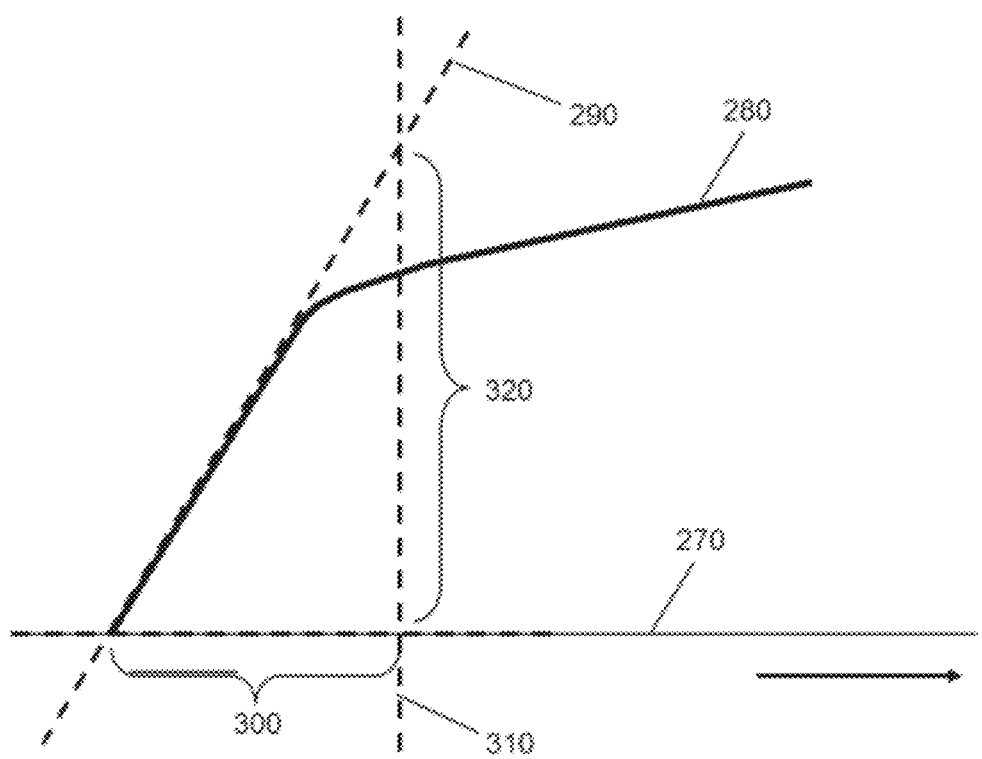
FIG. 10 illustrates a chart prepared from results of the initial elastic modulus measuring test.

The chart speed for this measurement is set to 300 mm/min. The initial elastic modulus is calculated by the following equation where H and X are as described below with reference to FIG. 10. X denotes an arbitrary distance used for determining the initial elastic modulus, and the height H 320 used for determining the initial elastic modulus is the distance from the position of said arbitrary distance X 300 used for determining initial elastic modulus to the intersection between the perpendicular 310 passing through said position and the line 290 showing the angle of the curve obtained from the initial elastic modulus measuring test.

$$\text{Initial elastic modulus (kgf/mm}^2\text{)}=(H \times L \times V1)/(X \times V2/S)/1,000$$

L: specimen length (mm)
V1: chart speed (mm/min)
V2: tension speed (mm/min)
S: cross section of hollow fiber membrane (mm$^2$)
X: arbitrary distance used for determining initial elastic modulus (mm)
H: height used for determining initial elastic modulus (mm)

(10) Measurement of Stretchability

The fiber is hung in an unloaded state and cut to 200 mm (original fiber length). A load of 0.01 g per dtex is applied to this fiber, and while this state is maintained, the fiber length is measured (fiber length in a loaded state). The stretchability is calculated by the following equation.

$$\text{Stretchability (\%)} = (L1-L0)/L0 \times 100$$

L0: original fiber length (mm)
L1: fiber length in a loaded state (mm)

(11) Durability Test for Hollow Fiber Membrane

Hollow fiber membrane units are assembled in a cylindrical module, and the lengthwise ends of the hollow fiber membranes are fixed with an adhesive to complete the potting procedure. Air is supplied to the outer side of the hollow fiber membranes in this cylindrical module so that a pressure of 100 kPa is applied, and air supply is continued in this state for 2 hours. After the 2 hour period, one end face is sealed, and air is supplied through the other end face so that a pressure of 10 kPa is applied. The module is kept in water during this operation. Observation is performed to check if bubbles come out of the hollow fiber membranes as a result of fiber breakage under the conditions.

(12) Measurement of Ratio of Length of Reinforcing Yarn Between Adhesion Points to Minimum Distance Between Adhesion Points The ratio of the length of the reinforcing yarn to that of the hollow fiber membrane is determined on the assumption that it represents the ratio of the length of the reinforcing yarns between the adhesion points to the minimum distance between the adhesion points. For one hollow fiber membrane unit in the module, the membranes are cut at the adhesion points at both ends to separate the hollow fiber membranes and the reinforcing yarn. An arbitrary hollow fiber membrane is selected, and the ratio of the length of the reinforcing yarn to the length of the hollow fiber membrane (length of reinforcing yarns/length of hollow fibers×100) is calculated. The same measurement is performed for five hollow fiber membrane units to determine the average ratio of the length of the reinforcing yarn to the length of the hollow fiber membrane. This average is regarded as the ratio of the length of the reinforcing yarns between the adhesion points to the minimum distance between the adhesion points.

(13) Measurement of Viscosity of Raw Material Solution for Membrane Production

The raw material solution for membrane production is put in a glass tube with a diameter of 30 mm and a height of 250 mm and maintained at the temperature that it has when it is discharged from the nozzle. A ball of stainless steel (with a diameter of 1 mm) is dropped into this raw material solution for membrane production to measure the time (seconds) it takes to fall to a depth of 10 mm.

The measured time (seconds) is multiplied by the constant 3.59 to calculate the viscosity (poise) of the raw material solution for membrane production.

Example 1

A raw material solution for membrane production consisting of 16 parts of polysulfone resin (P3500, supplied by Solvay), 6 parts of polyvinyl pyrrolidone (K30, supplied by ISP), 3 parts of polyvinyl pyrrolidone (K90, supplied by ISP), 74 parts of dimethyl acetamide, and 1 part of water was dissolved at 90° C. and maintained at 50° C. A core liquid consisting of 40 parts of dimethyl acetamide and 60 parts of water was prepared. The raw material solution for membrane production and the core liquid were discharged simultaneously from the outer and the inner tube, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. At this point, the viscosity of the raw material solution for membrane production was 18 poise. Subsequently, the coagulated hollow fiber membrane was rinsed in a water bath at 80° C. and the hollow fiber membrane still in a wet state was wound up on a reel. The membrane production speed in this step was 15 m/min and the hollow fiber membrane had an inside diameter of 660 µm, a membrane thickness of 95 µm, and a collapse resistance of 0.023.

The hollow fiber membrane thus wound up was cut to provide bundles of 1,000 membranes with a length of 0.3 m and dried at 50° C. for 24 hours in a dry-heat drier to provide hollow fiber membranes. After being dried, the hollow fiber membranes had an inside diameter of 660 µm and a membrane thickness of 95 µm.

Three of these hollow fiber membranes were taken out and a mini-module with a length of 0.1 m was produced. The air leakage was 0.0001 L/min or less and the water vapor permeability coefficient was 0.43 g/min/cm$^2$/MPa. The dense layer in the hollow fiber membranes had an average aperture area diameter of 0.9 nm. Lengthwise cross sections of the hollow fiber membranes were observed by electron microscopy and a dense layer with a thickness of 2 µm was found to exist near the inside surface. In the region with a 2 µm thickness measured from the boundary between the dense layer and the support layer, void (a), i.e. the void with the largest void length, had a void length of 0.4 µm. In the region with a 2 µm thickness ranging between 2 µm and 4 µm measured from the boundary between the dense layer and the support layer, void (b), i.e. the void with the largest void length, had a void length of 0.6 µm. Thus, the membrane had an asymmetric structure in which the void length of void (b) was larger than the void length of void (a). It was also found that voids (c) did not exist in the through-thickness central region of the membrane as seen in FIG. 8.

Because of the polysulfone concentration of 16 parts, the dense layer was thin and the membrane was also asymmetric with respect to the support layer.

Example 2

A raw material solution for membrane production consisting of 18 parts of polysulfone resin (P3500, supplied by Solvay), 9 parts of polyvinyl pyrrolidone (K30, supplied by ISP), 72 parts of dimethyl acetamide, and 1 part of water was dissolved at 90° C. and maintained at 50° C. A core liquid consisting of 40 parts of dimethyl acetamide and 60 parts of water was prepared. The raw material solution for membrane production and the core liquid were discharged simultaneously from the outer and the inner tube, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. At this point, the viscosity of the raw material solution for membrane production was 11 poise. Subsequently, the coagulated hollow fiber membrane was rinsed in a water bath at 80° C. and the hollow fiber membrane still in a wet state was wound up on a reel. The membrane production speed in this step was 15 m/min and the hollow fiber membrane had an inside diameter of 630 μm, a membrane thickness of 100 μm, and a collapse resistance of 0.04.

The hollow fiber membrane thus wound up was cut to provide bundles of 1,000 membranes with a length of 0.3 m and dried at 50° C. for 24 hours in a dry-heat drier to provide hollow fiber membranes. After being dried, the hollow fiber membranes had an inside diameter of 630 μm and a membrane thickness of 100 μm.

Three of these hollow fiber membranes were taken out and a mini-module with a length of 0.1 m was produced. The air leakage was 0.0002 L/min and the water vapor permeability coefficient was 0.52 g/min/cm$^2$/MPa. The dense layer in the hollow fiber membranes had an average aperture area diameter of 1.4 nm. Lengthwise cross sections of the hollow fiber membranes were observed by electron microscopy and a dense layer with a thickness of 1.5 μm was found to exist near the inside surface. In the region with a 2 μm thickness measured from the boundary between the dense layer and the support layer, void (a), i.e. the void with the largest void length, had a void length of 0.35 μm. In the region with a 2 μm thickness ranging between 2 μm and 4 μm measured from the boundary between the dense layer and the support layer, void (b), i.e. the void with the largest void length, had a void length of 0.6 μm. Thus, the membrane had an asymmetric structure in which the void length of void (b) was larger than the void length of void (a). In the through-thickness central region of the membrane, there were 7 finger void structures in every 9,500 μm$^2$ area. These finger voids had a void length, measured in the thickness direction of the membrane, that was equivalent to 60% of the membrane thickness of the hollow fiber membrane.

As compared with Example 1, the polysulfone concentration was higher, but the viscosity of the raw material solution for membrane production was lower because of the absence of high-molecular weight polyvinyl pyrrolidone (K90). As a result, the dense layer was thinner than in Example 1 and finger void structures were formed.

Example 3

The raw material solution for membrane production prepared by dissolving materials in Example 2 was maintained at 50° C. A core liquid consisting of 60 parts of dimethyl acetamide and 40 parts of water was prepared. The raw material solution for membrane production and the core liquid were discharged simultaneously from the outer and the inner tube, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. Subsequently, the coagulated hollow fiber membrane was rinsed in a water bath at 80° C. and the hollow fiber membrane still in a wet state was wound up on a reel. The membrane production speed in this step was 18 m/min and the hollow fiber membrane had an inside diameter of 660 μm, a membrane thickness of 90 μm, and a collapse resistance of 0.02.

The hollow fiber membrane thus wound up was cut to provide bundles of 1,000 membranes with a length of 0.3 m and dried at 170° C. for 5 hours in a dry-heat drier to provide hollow fiber membranes. After being dried, the hollow fiber membranes had an inside diameter of 660 μm and a membrane thickness of 90 μm.

Three of these hollow fiber membranes were taken out and a mini-module with a length of 0.1 m was produced. The air leakage was 0.018 L/min and the water vapor permeability coefficient was 0.66 g/min/cm$^2$/MPa. The dense layer in the hollow fiber membranes had an average aperture area diameter of 2.1 nm. Lengthwise cross sections of the hollow fiber membranes were observed by electron microscopy and a dense layer with a thickness of 1.7 μm was found to exist near the inside surface. In the region with a 2 μm thickness measured from the boundary between the dense layer and the support layer, void (a), i.e. the void with the largest void length, had a void length of 0.5 μm. In the region with a 2 μm thickness ranging between 2 μm and 4 μm measured from the boundary between the dense layer and the support layer, void (b), i.e. the void with the largest void length, had a void length of 0.65 μm. Thus, the membrane had an asymmetric structure in which the void length of void (b) was larger than the void length of void (a). In the through-thickness central region of the membrane, there were 6 finger void structures in every 9,500 μm$^2$ area. These finger voids had a void length, measured in the thickness direction of the membrane, that was equivalent to 52% of the membrane thickness of the hollow fiber membrane.

Example 4

The raw material solution for membrane production prepared by dissolving materials in Example 2 was maintained at 50° C. A core liquid consisting of 60 parts of dimethyl acetamide and 40 parts of water was prepared. The raw material solution for membrane production and the core liquid were discharged simultaneously from the outer and the inner tube, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. Subsequently, the coagulated hollow fiber membrane was rinsed in a water bath at 80° C. and the hollow fiber membrane still in a wet state was wound up on a reel. The membrane production speed in this step was 18 m/min and the hollow fiber membrane had an inside diameter of 660 μm, a membrane thickness of 90 μm, and a collapse resistance of 0.02.

The hollow fiber membrane thus wound up was cut to provide bundles of 1,000 membranes with a length of 0.3 m and dried at 50° C. for 24 hours in a dry-heat drier to provide water vapor permeable, hollow fiber membranes. After being dried, the hollow fiber membranes had an inside diameter of 660 μm and a membrane thickness of 90 μm.

Three of these hollow fiber membranes were taken out and a mini-module with a length of 0.1 m was produced. The air leakage was 0.0002 L/min and the water vapor permeability coefficient was 0.52 g/min/cm$^2$/MPa. The dense layer in the hollow fiber membranes had an average aperture area diameter of 1.4 nm. Three of these hollow fiber membranes were taken out and a mini-module with a length of 0.1 m was produced. The air leakage was 0.065 L/min. When subjected to water vapor permeability measurement, however, the hollow fiber membrane was wet with water vapor and the air leakage was 0.0001 L/min or less. Consequently, it was possible to measure the water vapor permeability coefficient, and the water vapor permeability coefficient was 0.72 g/min/cm$^2$/MPa. The dense layer in the hollow fiber membranes had an average aperture area diameter of 2.5 nm. Lengthwise cross sections of the hollow fiber membranes were observed by electron microscopy and a dense layer with a thickness of 1.7 µm was found to exist near the inside surface. In the region with a 2 µm thickness measured from the boundary between the dense layer and the support layer, void (a), i.e. the void with the largest void length, had a void length of 0.5 µm. In the region with a 2 µm thickness ranging between 2 µm and 4 µm measured from the boundary between the dense layer and the support layer, void (b), i.e. the void with the largest void length, had a void length of 0.65 µm. Thus, the membrane had an asymmetric structure in which the void length of void (b) was larger than the void length of void (a). In the through-thickness central region of the membrane, there were 6 finger void structures in every 9,500 µm² area. These finger voids had a void length, measured in the thickness direction of the membrane, that was equivalent to 52% of the membrane thickness of the hollow fiber membrane.

Example 5

A hollow fiber membrane was discharged from the nozzle and then rinsed by the same procedure as in Example 2. After the rinsing, a textured polyester yarn of 170 dtex was wound helically around two such hollow fiber membranes for covering. Polyphenylene sulfide fiber (tow with outside diameter of 330 µm and stretchability of 0.5%) of 440 dtex was prepared for use as reinforcing yarn. The reinforcing yarn was allowed to travel nearly straight by applying a tension to the fiber. Six tows of covered hollow fiber membranes (total of 12 hollow fiber membranes) were collected and allowed to travel in parallel with the reinforcing yarn. A textured polyester yarn of 170 dtex was wound to combine the reinforcing yarn and the 6 tows of hollow fiber membranes to achieve double covering, providing a hollow fiber membrane unit. This hollow fiber membrane unit was wound up on a reel. The hollow fiber membrane unit was produced inline, that is, in continuous steps from discharging to winding-up. The hollow fiber membrane had an outside diameter of 830 µm, an inside diameter of 630 µm, a membrane thickness of 100 µm, and a collapse resistance of 0.04.

The hollow fiber membrane unit thus wound up was cut to provide bundles of 100 units with a length of 0.3 m and dried at 50° C. for 24 hours in a dry-heat drier to provide hollow fiber units consisting of hollow fiber membranes, covering yarns, and reinforcing yarns. After being dried, the hollow fiber membranes had an inside diameter of 630 µm and a membrane thickness of 100 µm.

Three of these hollow fiber membranes were taken out and a mini-module with a length of 0.1 m was produced. The air leakage was 0.0002 L/min and the water vapor permeability coefficient was 0.52 g/min/cm²/MPa. The dense layer in the hollow fiber membranes had an average aperture area diameter of 1.4 nm. Lengthwise cross sections of the hollow fiber membranes were observed by electron microscopy and a dense layer with a thickness of 1.5 µm was found to exist near the inside surface. In the region with a 2 µm thickness measured from the boundary between the dense layer and the support layer, void (a), i.e. the void with the largest void length, had a void length of 0.35 µm. In the region with a 2 µm thickness ranging between 2 µm and 4 µm measured from the boundary between the dense layer and the support layer, void (b), i.e. the void with the largest void length, had a void length of 0.6 µm. Thus, the membrane had an asymmetric structure in which the void length of void (b) was larger than the void length of void (a). In the through-thickness central region of the membrane, there were 7 finger void structures in every 9,500 µm² area. These finger voids had a void length, measured in the thickness direction of the membrane, that was equivalent to 60% of the thickness of the hollow fiber membrane.

The hollow fiber membrane at this point had an initial elastic modulus of 15 kgf/mm². The polyphenylene sulfide used as reinforcing yarn had an initial elastic modulus of 540 kgf/mm² (36 times that of hollow fiber).

This hollow fiber membrane unit was cut to produce bundles of 145 units (1,740 hollow fiber membranes in total), and combined in a cylindrical aluminum module container with a diameter of 50 mm and a length of 300 mm, followed by fixing the ends of the hollow fiber membrane units with an adhesive. The module was subjected to durability test, and breakage of hollow fiber membranes was not found in 2 hours.

After the durability test, the module was disassembled and the ratio of the length of the reinforcing yarn to that of the hollow fiber membrane (representing the ratio of the length of the reinforcing yarns between adhesion points to the minimum distance between adhesion points) was measured and found to be 100.9%.

Example 6

A hollow fiber membrane was discharged from the nozzle and then rinsed by the same procedure as in Example 2. After the rinsing, two hollow fiber membranes were combined with supplementary textured polyester yarns of 170 dtex (outside diameter of 210 µm and stretchability of 1.25%) which were in a tensionless state and arranged in parallel with the former, and other textured polyester yarns of 170 dtex were wound up helically around them for covering. Polyphenylene sulfide fiber (tow with outside diameter of 330 µm and stretchability of 0.5%) of 440 dtex was prepared for use as reinforcing yarn. A tension was applied to the reinforcing yarn to stretch the fiber so that it was allowed to travel nearly straight. Two tows of covered hollow fiber membranes combined with supplementary yarns (total of 4 hollow fiber membranes) were collected and allowed to travel in parallel with the reinforcing yarn. A textured polyester yarn of 170 dtex was wound to combine the reinforcing yarn and the 2 tows of hollow fiber membranes combined with supplementary yarns to achieve double covering, providing a hollow fiber membrane unit. This hollow fiber membrane unit was wound up on a reel. The hollow fiber membrane unit was produced inline, that is, in continuous steps from discharging to winding-up. The hollow fiber membrane had an outside diameter of 830 µm, an inside diameter of 630 µm, a membrane thickness of 100 µm, and a collapse resistance of 0.04.

The hollow fiber membrane unit thus wound up was cut to provide bundles of 100 units with a length of 0.3 m and dried at 50° C. for 24 hours in a dry-heat drier to provide hollow fiber units consisting of hollow fiber membranes, supplementary yarns, reinforcing yarns, and covering yarns. After being dried, the hollow fiber membranes had an inside diameter of 660 µm and a membrane thickness of 90 µm.

Three of these hollow fiber membranes were taken out and a mini-module with a length of 0.1 m was produced. The air leakage was 0.0002 L/min and the water vapor permeability coefficient was 0.52 g/min/cm²/MPa. The dense layer in the hollow fiber membranes had an average aperture area diameter of 1.4 nm. Lengthwise cross sections of the hollow fiber membranes were observed by electron microscopy and a dense layer with a thickness of 1.5 µm was found to exist near the inside surface. In the region with a 2 µm thickness measured from the boundary between the dense layer and the support layer, void (a), i.e. the void with the largest void length, had a void length of 0.35 µm. In the region with a 2 µm thickness ranging between 2 µm and 4 µm measured from the boundary between the dense layer and the support layer, void (b), i.e. the void with the largest void length, had a void length of 0.6 µm. Thus, the membrane had an asymmetric structure in which the void length of void (b) was larger than the void length of void (a). In the through-thickness central region of the membrane, there were 7 finger void structures in every 9,500 µm² area. These finger voids had a void length, measured in the thickness direction of the membrane, that was equivalent to 60% of the thickness of the hollow fiber membrane.

The hollow fiber membrane at this point had an initial elastic modulus of 14.6 kgf/mm². The polyphenylene sulfide used as reinforcing yarn had an initial elastic modulus of 540 kgf/mm² (37 times that of hollow fiber). This hollow fiber membrane unit was cut to produce bundles of 388 units (1,552 hollow fiber membranes in total), and combined in a cylindrical aluminum module container with a diameter of 50 mm and a length of 300 mm, followed by fixing the ends of the hollow fiber membrane units with an adhesive. The module was subjected to durability test, and breakage of hollow fiber membranes was not found in 2 hours.

After the durability test, the module was disassembled and the ratio of the length of the reinforcing yarn to that of the hollow fiber membrane (representing the ratio of the length of the reinforcing yarns between adhesion points to the minimum distance between adhesion points) was measured and found to be 100.8%.

Example 7

A hollow fiber membrane was discharged from the nozzle and then rinsed by the same procedure as in Example 2. After the rinsing, a textured polyester yarn of 170 dtex was wound helically around two such hollow fiber membranes for covering. Furthermore, six tows of covered hollow fiber membranes (total of 12 hollow fiber membranes) were collected and a textured polyester yarn of 170 dtex was wound up without using reinforcing yarns to achieve double covering, providing hollow fiber membrane units. This hollow fiber membrane unit was wound up on a reel. The hollow fiber membrane unit was produced inline, that is, in continuous steps from discharging to winding-up. The hollow fiber membrane had an outside diameter of 830 µm, an inside diameter of 630 µm, a membrane thickness of 100 µm, and a collapse resistance of 0.04.

The hollow fiber membrane unit thus wound up was cut to provide bundles of 100 units with a length of 0.3 m and dried at 50° C. for 24 hours in a dry-heat drier to provide hollow fiber units consisting of hollow fiber membranes and covering yarns. After being dried, the hollow fiber membranes had an inside diameter of 630 µm and a membrane thickness of 95 µm.

Three of these hollow fiber membranes were taken out and a mini-module with a length of 0.1 m was produced. The air leakage was 0.0002 L/min and the water vapor permeability coefficient was 0.52 g/min/cm²/MPa. The dense layer in the hollow fiber membranes had an average aperture area diameter of 1.4 nm. Lengthwise cross sections of the hollow fiber membranes were observed by electron microscopy and a dense layer with a thickness of 1.5 µm was found to exist near the inside surface. In the region with a 2 µm thickness measured from the boundary between the dense layer and the support layer, void (a), i.e. the void with the largest void length, had a void length of 0.35 µm. In the region with a 2 µm thickness ranging between 2 µm and 4 µm measured from the boundary between the dense layer and the support layer, void (b), i.e. the void with the largest void length, had a void length of 0.6 µm. Thus, the membrane had an asymmetric structure in which the void length of void (b) was larger than the void length of void (a). In the through-thickness central region of the membrane, there were 7 finger void structures in every 9,500 µm² area. These finger voids had a void length, measured in the thickness direction of the membrane, that was equivalent to 60% of the thickness of the hollow fiber membrane.

The hollow fiber membrane at this point had an initial elastic modulus of 15 kgf/mm². This hollow fiber membrane unit was cut to produce bundles of 145 units (1,740 hollow fiber membranes in total), and combined in a cylindrical aluminum module container with a diameter of 50 mm and a length of 300 mm, followed by fixing the ends of the hollow fiber membrane units with an adhesive. The module was subjected to durability test, and bubbles from broken hollow fiber membranes were found in water. The broken hollow fiber membranes were counted and 115 broken hollow fiber membranes were found.

Example 8

A hollow fiber membrane was discharged from the nozzle and then rinsed by the same procedure as in Example 2. After the rinsing, a textured polyester yarn of 170 dtex was wound helically around two such hollow fiber membranes for covering. A textured polyester yarn (tow with outside diameter of 210 µm and stretchability of 1.25%) of 170 dtex were prepared for use as reinforcing yarn. With no tension applied, the reinforcing yarn was allowed to travel in a non-straight state. Six tows of covered hollow fiber membranes (total of 12 hollow fiber membranes) were collected and allowed to travel in parallel with the reinforcing yarn. A textured polyester yarn of 170 dtex was wound to combine the reinforcing yarn and the 6 tows of hollow fiber membranes to achieve double covering, providing a hollow fiber membrane unit. This hollow fiber membrane unit was wound up on a reel. The hollow fiber membrane unit was produced inline, that is, in continuous steps from discharging to winding-up. The hollow fiber membrane had an outside diameter of 830 µm, an inside diameter of 630 µm, a membrane thickness of 100 µm, and a collapse resistance of 0.04. The textured polyester yarn had a density of 1.38 g/cm³.

The hollow fiber membrane unit thus wound up was cut to provide bundles of 100 units with a length of 0.3 m and dried at 50° C. for 24 hours in a dry-heat drier to provide hollow fiber units consisting of hollow fiber membranes, covering yarns, and reinforcing yarns. After being dried, the hollow fiber membranes had an inside diameter of 630 µm and a membrane thickness of 95 µm.

Three of these hollow fiber membranes were taken out and a mini-module with a length of 0.1 m was produced. The air leakage was 0.0002 L/min and the water vapor permeability coefficient was 0.52 g/min/cm²/MPa. The dense layer in the hollow fiber membranes had an average aperture area diameter of 1.4 nm. Lengthwise cross sections of the hollow fiber membranes were observed by electron microscopy and a dense layer with a thickness of 1.5 µm was found to exist near the inside surface. In the region with a 2 µm thickness measured from the boundary between the dense layer and the support layer, void (a), i.e. the void with the largest void length, had a void length of 0.35 µm. In the region with a 2 µm thickness ranging between 2 µm and 4 µm measured from the boundary between the dense layer and the support layer, void (b), i.e. the void with the largest void length, had a void length of 0.6 μm. Thus, the membrane had an asymmetric structure in which the void length of void (b) was larger than the void length of void (a). In the through-thickness central region of the membrane, there were 7 finger void structures in every 9,500 μm² area. These finger voids had a length, measured in the thickness direction of the membrane, that was equivalent to 60% of the thickness of the hollow fiber membrane.

The hollow fiber membrane at this point had an initial elastic modulus of 15 kgf/mm². The polyester used as reinforcing yarn had an initial elastic modulus of 110 kgf/mm² (7 times that of hollow fiber). This hollow fiber membrane unit was cut to produce bundles of 145 units (1,740 hollow fiber membranes in total), and combined in a cylindrical aluminum module container with a diameter of 50 mm and a length of 300 mm, followed by fixing the ends of the hollow fiber membrane units with an adhesive. The module was subjected to durability test, and bubbles from broken hollow fiber membranes were found in water. The broken hollow fiber membranes were counted and 83 broken hollow fiber membranes were found.

After the durability test, the module was disassembled and the ratio of the length of the reinforcing yarn to that of the hollow fiber membrane (representing the ratio of the length of the reinforcing yarns between adhesion points to the minimum distance between adhesion points) was measured and found to be 103%.

Example 9

A hollow fiber membrane was discharged and then rinsed by the same procedure as in Example 1. After the rinsing, a textured polyester yarn of 170 dtex was wound helically around two such hollow fiber membranes for covering. A Copper wire (25,000 dtex) with an outside diameter of 0.3 mm was used as reinforcing yarn. Six tows of covered hollow fiber membranes (total of 12 hollow fiber membranes) were collected and allowed to travel in parallel with the reinforcing yarn. An attempt was made to provide a hollow fiber membrane unit consisting of hollow fiber membranes, covering yarns, and a reinforcing yarn produced inline, that is, in continuous steps from discharging to winding-up. Because of the stiffness of the reinforcing yarn, however, it was impossible to produce a hollow fiber membrane unit consisting of hollow fiber membranes, covering yarns, and reinforcing yarns.

Comparative Example 1

A raw material solution for membrane production consisting of 18 parts of polysulfone resin (P3500, supplied by Solvay), 6 parts of polyvinyl pyrrolidone (K30, supplied by ISP), 3 parts of polyvinyl pyrrolidone (K90, supplied by ISP), 72 parts of dimethyl acetamide, and 1 part of water was dissolved at 90° C. and maintained at 50° C. A core liquid consisting of 40 parts of dimethyl acetamide and 60 parts of water was prepared. The raw material solution for membrane production and the core liquid were discharged simultaneously from the outer and the inner tube, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. At this point, the viscosity of the raw material solution for membrane production was 34 poise. Subsequently, the coagulated hollow fiber membrane was rinsed in a water bath at 80° C. and the hollow fiber membrane still in a wet state was wound up on a reel. The membrane production speed in this step was 15 m/min and the hollow fiber membrane had an inside diameter of 650 μm, a membrane thickness of 95 μm, and a collapse resistance of 0.025.

The hollow fiber membrane thus wound up was cut to provide bundles of 1,000 membranes with a length of 0.3 m and dried at 50° C. for 24 hours in a dry-heat drier to provide hollow fiber membranes. After being dried, the hollow fiber membranes had an inside diameter of 650 μm and a membrane thickness of 95 μm.

Three of these water vapor permeable, hollow fiber membranes were taken out and a mini-module with a length of 0.1 m was produced. The air leakage was 0.0001 L/min or less and the water vapor permeability coefficient was 0.28 g/min/cm²/MPa. The dense layer in the hollow fiber membranes had an average aperture area diameter of 0.8 nm. Lengthwise cross sections of the hollow fiber membranes were observed by electron microscopy and a dense layer with a thickness of 2.4 μm was found to exist. In the region with a 2 μm thickness measured from the boundary between the dense layer and the support layer, void (a), i.e. the void with the largest void length, had a void length of 0.25 μm, and there were no voids with a void length of 0.3 μm or more. In the region with a 2 μm thickness ranging between 2 μm and 4 μm measured from the boundary between the dense layer and the support layer, void (b), i.e. the void with the largest void length, had a void length of 0.4 μm, and there were no voids with a void length of 0.5 μm or more. Nevertheless, the membrane had an asymmetric structure with the voids near the outside surface having larger lengths than those near the inside surface. It was also found that voids (c) did not exist in the through-thickness central region of the membrane.

As compared with Example 1, the polysulfone concentration was higher and the viscosity of the raw material solution for membrane production was also higher, making the dense layer so thick that voids (c) were not formed in the central region in the support layer.

Comparative Example 2

A raw material solution for membrane production consisting of 18 parts of polysulfone resin (P3500, supplied by Solvay), 9 parts of polyvinyl pyrrolidone (K30, supplied by ISP), 72 parts of dimethyl acetamide, and 1 part of water was dissolved at 90° C. and maintained at 50° C. A core liquid consisting of 40 parts of dimethyl acetamide and 60 parts of water was prepared. The raw material solution for membrane production and the core liquid were discharged simultaneously from the outside and the central opening, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. Subsequently, the coagulated hollow fiber membrane was rinsed in a water bath at 80° C. and the hollow fiber membrane still in a wet state was wound up on a reel. The membrane production speed in this step was 15 m/min and the hollow fiber membrane had an inside diameter of 630 μm, a membrane thickness of 100 μm, and a collapse resistance of 0.032.

Lengthwise cross sections of the hollow fiber membranes were observed by electron microscopy and a dense layer with a thickness of 2.4 μm was found to exist. In the region with a 2 μm thickness measured from the boundary between the dense layer and the support layer, void (a), i.e. the void with the largest void length, had a void length of 0.35 μm. In the region with a 2 μm thickness ranging between 2 μm and 4 μm measured from the boundary between the dense layer and the support layer, void (b), i.e. the void with the largest void length, had a void length of 0.6 μm. Thus, the membrane had an asymmetric structure in which the void length of void (b) was larger than the void length of void (a). In the central region of the membrane, there were 6 finger void structures in every 9,500 μm² area. These finger voids had a void length, measured in the thickness direction of the membrane, that was equivalent to 52% of the membrane thickness of the hollow fiber membrane. The hollow fiber membrane wound up was not subjected to drying treatment.

Three of these hollow fiber membranes were taken out and a mini-module with a length of 0.1 m was produced. The air leakage was measured and the air leakage was found to be 0.1 L/min or more. Since the heat-setting step was not carried out in the membrane production process, large voids were formed in the hollow fiber membrane and the air leakage increased. Consequently, it was impossible to measure the water vapor permeability.

Comparative Example 3

A raw material solution for membrane production consisting of 24 parts of polysulfone resin (P3500, supplied by Solvay), 6 parts of polyvinyl pyrrolidone (K30, supplied by ISP), 69 parts of dimethyl acetamide, and 1 part of water was dissolved at 110° C. and maintained at 50° C. A core liquid consisting of 75 parts of dimethyl acetamide and 25 parts of water was prepared. The raw material solution for membrane production and the core liquid were discharged simultaneously from the outer and the inner tube, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. At this point, the viscosity of the raw material solution for membrane production was 41 poise. Subsequently, the coagulated hollow fiber membrane was rinsed in a water bath at 80° C. and the hollow fiber membrane still in a wet state was wound up on a reel. The membrane production speed in this step was 15 m/min and the hollow fiber membrane had an inside diameter of 640 μm, a membrane thickness of 95 μm, and a collapse resistance of 0.033.

The hollow fiber membrane thus wound up was cut to provide bundles of 1,000 membranes with a length of 0.3 m and dried at 50° C. for 24 hours in a dry-heat drier to provide hollow fiber membranes. After being dried, the hollow fiber membranes had an inside diameter of 640 μm and a membrane thickness of 95 μm.

Three of these water vapor permeable, hollow fiber membranes were taken out and a mini-module with a length of 0.1 m was produced. The air leakage was 0.0001 L/min or less and the water vapor permeability coefficient was 0.12 g/min/cm²/MPa. The dense layer in the hollow fiber membranes had an average aperture area diameter of 0.6 nm. Lengthwise cross sections of the hollow fiber membranes were observed by electron microscopy and a dense layer with a thickness of 0.8 μm was found to exist. In the region with a 2 μm thickness measured from the boundary between the dense layer and the support layer, void (a), i.e. the void with the largest void length, had a void length of 0.7 μm. However, in the region with a 2 μm thickness ranging between 2 μm and 4 μm measured from the boundary between the dense layer and the support layer, void (b), i.e. the void with the largest void length, had a void length of 0.4 μm, and there were no voids with a void length of 0.5 μm or more. Accordingly, the membrane did not have an asymmetric structure in which the voids near the outside surface have larger lengths than those near the inside surface. It was also found that voids (c) did not exist in the through-thickness central region of the membrane.

As compared with Example 1, the polysulfone concentration was higher and the viscosity of the raw material solution for membrane production was also higher. The dense layer was thin, but because the solvent accounted for a large part of the infusion liquid, the support layer was not asymmetric and voids (c) were not formed either in the central region of the support layer.

Comparative example 4

A raw material solution for membrane production consisting of 32 parts of polysulfone resin (P1700, supplied by Solvay), 8 parts of polyvinyl pyrrolidone (K30, supplied by ISP), 4 parts of polyvinyl pyrrolidone (K90, supplied by ISP), 55 parts of dimethyl acetamide, and 1 part of water was dissolved at 110° C. and maintained at 50° C. A core liquid consisting of 63 parts of dimethyl acetamide and 37 parts of water was prepared. The raw material solution for membrane production and the core liquid were discharged simultaneously from the outer and the inner tube, respectively, of a bicylindrical nozzle with an outside diameter of 1.0 mm and an inside diameter of 0.7 mm. The discharged liquid was passed through a 350 mm dry-air portion at a temperature of 30° C., followed by being immersed in a coagulation bath at 40° C. consisting of 90 parts of water and 10 parts of dimethyl acetamide. At this point, the viscosity of the raw material solution for membrane production was 1200 poise. Subsequently, the coagulated hollow fiber membrane was rinsed in a water bath at 80° C. and the hollow fiber membrane still in a wet state was wound up on a reel. The membrane production speed in this step was 15 m/min and the hollow fiber membrane had an inside diameter of 600 μm, a membrane thickness of 100 μm, and a collapse resistance of 0.046.

The hollow fiber membrane thus wound up was cut to provide bundles of 1,000 membranes with a length of 0.3 m and dried at 50° C. for 24 hours in a dry-heat drier to provide hollow fiber membranes. After being dried, the hollow fiber membranes had an inside diameter of 600 μm and a membrane thickness of 100 μm.

Three of these water vapor permeable, hollow fiber membranes were taken out and a mini-module with a length of 0.1 m was produced. The air leakage was 0.0001 L/min or less and the water vapor permeability coefficient was 0.05 g/min/cm²/MPa. The dense layer in the hollow fiber membranes had an average aperture area diameter of 0.3 nm. Lengthwise cross sections of the hollow fiber membranes were observed by electron microscopy and a dense layer with a thickness of 2.0 μm was found to exist. In the region with a 2 μm thickness measured from the boundary between the dense layer and the support layer, void (a), i.e. the void with the largest void length, had a void length of 0.2 μm, and there were no voids with a void length of 0.3 μm or more. In the region with a 2 μm thickness ranging between 2 μm and 4 μm measured from the boundary between the dense layer and the support layer, void (b), i.e. the void with the largest void length, had a void length of 0.2 μm, and there were no voids with a void length of 0.5 μm or more. Although a dense layer existed, the membrane had a symmetric structure without any asymmetry from the inside surface toward the outside surface. It was also found that voids (c) did not exist in the through-thickness central region of the membrane.

As compared with Example 1, the polysulfone concentration was higher and the viscosity of the raw material solution for membrane production was also higher. A dense layer was found to exist, but because the solvent accounted for a large part of the infusion liquid, the support layer was not asymmetric and voids (c) were not formed either in the central region of the support layer.

EXPLANATION OF NUMERALS

10: X axis of a finger void structure
20: Y axis of a finger void structure
30: cross section near the outer surface of a hollow fiber membrane
40: void-containing portion in the central region of the cross section of a hollow fiber membrane
50: cross section near the inner surface of a hollow fiber membrane
60: Surface of a water vapor permeable membrane
65: boundary plane
70: void portion
80: dense layer
90: boundary line located 2 μm away from dense layer
100: boundary line located 4 μm away from dense layer
110: sweep gas inlet
120: temperature and humidity measuring points
130: air meter
140: sweep gas outlet
150: temperature and humidity measuring points
160: humidifier
170: offgas inlet
180: offgas gas outlet
190: mini-module
200: air meter
210: stopper
220: cross section near the outer surface of a hollow fiber membrane
230: cross section near the inner surface of a hollow fiber membrane
240: hollow fiber membrane
250: clamp
260: specimen length of hollow fiber membrane
270: baseline
280: line drawn based on initial elastic modulus measuring test
290: extended line showing the gradient of the line drawn based on initial elastic modulus measuring test
300: arbitrary distance X used for determining initial elastic modulus
310: perpendicular line
320: height H used for determining initial elastic modulus
330: covered hollow fiber
340: hollow fiber membrane
350: textured yarn (single covering yarn)
360: reinforcing yarn
370: hollow fiber membrane unit
380: textured yarn (double covering yarn)
390: hollow fiber membrane module
400: adhesive
410: adhesion point
420: minimum distance connecting the adhesion pones
430: slack reinforcing yarn
440: tight reinforcing yarn

The invention claimed is:

1. A water vapor permeable membrane comprising a dense layer and a support layer that are adjacent to each other,
wherein said dense layer contains voids with a length of 0.1 μm or less and said dense layer has a thickness of 0.1 μm or more and 2 μm or less,
while in said support layer, a void (a) with the largest length in the 2 μm thick region measured from the boundary between the dense layer and the support layer into the support layer has a length of 0.3 μm or more and a void (b) with the largest length in the region ranging between 2 μm and 4 μm measured from said boundary into the support layer has a length of 0.5 μm or more, the length of said void (b) being larger than that of said void (a).

2. A water vapor permeable membrane as claimed in claim 1 wherein said support layer contains voids (c) that have an internal dimension in the thickness direction of the water vapor permeable membrane equivalent to 30% or more of the thickness of the water vapor permeable membrane.

3. A water vapor permeable membrane as claimed in claim 2 wherein said voids (c) have a finger void structure.

4. A water vapor permeable membrane as claimed in claim 1 wherein the water vapor permeable membrane has an air leakage of 0.1 L/min or less.

5. A hollow fiber membrane comprising a water vapor permeable membrane as claimed in claim 1 that has a hollow structure.

6. A hollow fiber membrane unit comprising hollow fiber membranes as claimed in claim 5 and a nearly straight reinforcing yarn that are covered together with covering yarns.

7. A hollow fiber membrane module comprising two or more hollow fiber membranes as claimed in claim 5.

8. A humidifier comprising a hollow fiber membrane module as claimed in claim 7.

9. A hollow fiber membrane module comprising two or more hollow fiber membrane units as claimed in claim 6.

10. A humidifier comprising a hollow fiber membrane module as claimed in claim 9.

* * * * *